United States Patent
Teetzel et al.

(10) Patent No.: US 10,948,253 B2
(45) Date of Patent: Mar. 16, 2021

(54) SENSOR SYSTEM FOR ADVANCED SMART WEAPONS BARRELS

(71) Applicant: Wilcox Industries Corp., Newington, NH (US)

(72) Inventors: James W. Teetzel, Portsmouth, NH (US); Jared Majcher, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 232 days.

(21) Appl. No.: 15/868,672

(22) Filed: Jan. 11, 2018

(65) Prior Publication Data

US 2019/0011208 A1 Jan. 10, 2019

Related U.S. Application Data

(60) Provisional application No. 62/446,222, filed on Jan. 13, 2017, provisional application No. 62/513,738, filed on Jun. 1, 2017.

(51) Int. Cl.
| | |
|---|---|
| *F41A 21/02* | (2006.01) |
| *G01D 11/24* | (2006.01) |
| *F41A 31/02* | (2006.01) |
| *F41A 21/48* | (2006.01) |

(52) U.S. Cl.
CPC .............. *F41A 21/02* (2013.01); *F41A 31/02* (2013.01); *G01D 11/245* (2013.01); *F41A 21/48* (2013.01)

(58) Field of Classification Search
CPC ........... G01P 3/665; G01P 3/685; F41A 21/32
See application file for complete search history.

(56) References Cited

U.S. PATENT DOCUMENTS

| | | | |
|---|---|---|---|
| 37,193 | A | 12/1862 | Alsop |
| 337,916 | A | 3/1886 | Ballard |
| 487,487 | A | 12/1892 | Mason |
| 555,582 | A | 3/1896 | Perl |
| 797,345 | A | 8/1905 | Cokeroft |
| 1,013,974 | A | 1/1912 | Vandenbossche |
| 1,266,087 | A | 5/1918 | Williams |

(Continued)

FOREIGN PATENT DOCUMENTS

| | | | | |
|---|---|---|---|---|
| CH | 693248 | A5 * | 4/2003 | .............. F41G 3/12 |
| DE | 924737 | C * | 3/1955 | .............. F41A 17/16 |

(Continued)

*Primary Examiner* — Benjamin P Lee
(74) *Attorney, Agent, or Firm* — McLane Middleton, Professional Association

(57) ABSTRACT

In one aspect, a sensor system for advanced smart weapons barrels includes one or more sensors, the sensors connected to a processor by way of conductive elements. The smart weapons barrel system may include one or more barrel segments, such segments being removably attached to each other. In certain embodiments, the sensors are positioned along the barrel segments and generate an electrical signal in response to a projectile being fired by the host firearm as the projectile moves past the respective sensor. The processor receives raw data from the sensor signal and may extrapolate and/or calculate further information in order to determine any number of a variety of metrics or other data analysis, including, but not limited to, round count projectile velocity, rate of fire, etc.

25 Claims, 40 Drawing Sheets

(56) References Cited

U.S. PATENT DOCUMENTS

| | | | |
|---|---|---|---|
| 1,605,741 A | 11/1926 | Jones | |
| 2,014,184 A | 9/1935 | Linder | |
| 2,489,568 A | 11/1949 | Ferhat | |
| 3,486,411 A | 12/1969 | Lichtenstem | |
| 4,368,589 A | 1/1983 | A'Costa | |
| 4,546,564 A | 10/1985 | A'Costa | |
| 4,674,217 A | 6/1987 | Matievich | |
| 4,676,528 A | 6/1987 | Gray | |
| 4,677,376 A * | 6/1987 | Ettel | G01P 3/665 324/179 |
| 4,713,903 A | 12/1987 | Mainland | |
| 5,271,312 A | 12/1993 | Lishness et al. | |
| 5,351,428 A | 10/1994 | Graham | |
| 5,394,633 A | 3/1995 | Alessandri, Jr. | |
| 5,544,564 A | 8/1996 | Balbo et al. | |
| 5,600,912 A | 2/1997 | Smith | |
| 6,064,196 A * | 5/2000 | Oberlin | G01P 3/665 324/179 |
| 6,128,846 A | 10/2000 | Walker et al. | |
| 6,698,128 B2 | 3/2004 | Kessler | |
| 7,076,904 B1 | 7/2006 | Rustick | |
| 7,353,740 B1 | 4/2008 | Hoffman | |
| 7,595,633 B2 * | 9/2009 | Martin | F41A 21/32 324/179 |
| 7,866,079 B2 * | 1/2011 | Keeney | F41A 21/02 42/76.01 |
| 8,305,071 B2 * | 11/2012 | Frick | G01P 3/665 124/3 |
| 8,739,450 B2 | 6/2014 | Piontek | |
| 8,991,093 B1 | 3/2015 | Calvert | |
| 9,182,187 B1 | 11/2015 | Griffith | |
| 9,222,747 B1 | 12/2015 | Morrison | |
| 9,261,318 B2 | 2/2016 | Wood, Jr. et al. | |
| 9,513,095 B2 * | 12/2016 | Redler | F42B 15/01 |
| 9,513,308 B2 * | 12/2016 | Jung | F41A 21/32 |
| 9,541,343 B2 | 1/2017 | Dodson | |
| 9,964,376 B2 | 5/2018 | Odle et al. | |
| 2003/0019352 A1 | 1/2003 | Mika | |
| 2003/0156272 A1 * | 8/2003 | Cytron | F41A 21/32 356/28 |
| 2005/0115316 A1 * | 6/2005 | Giusti | F41A 21/32 73/488 |
| 2005/0132872 A1 | 6/2005 | Jensen | |
| 2005/0262997 A1 | 12/2005 | Brixius | |
| 2008/0190191 A1 * | 8/2008 | Martin | F41A 21/32 73/167 |
| 2008/0211710 A1 * | 9/2008 | Frick | F41A 21/32 342/104 |
| 2011/0023694 A1 | 2/2011 | Haywood | |
| 2012/0026337 A1 * | 2/2012 | Boulanger | G01J 5/046 348/164 |
| 2012/0085162 A1 * | 4/2012 | Furch | F41A 21/325 73/167 |
| 2012/0125092 A1 * | 5/2012 | Downing | G01L 5/14 73/167 |
| 2013/0305819 A1 * | 11/2013 | Redler | F42B 15/01 73/167 |
| 2014/0075818 A1 * | 3/2014 | Piontek | F41A 21/10 42/77 |
| 2014/0182472 A1 * | 7/2014 | Jung | F41A 21/32 102/200 |
| 2015/0107350 A1 * | 4/2015 | Fohrman | G01P 15/12 73/167 |
| 2015/0135575 A1 | 5/2015 | Wood, Jr. et al. | |
| 2015/0267988 A1 | 9/2015 | Sellars | |
| 2015/0330732 A1 * | 11/2015 | Sullivan | F41A 17/06 89/1.3 |
| 2016/0033225 A1 | 2/2016 | Selvetti | |
| 2016/0363402 A1 * | 12/2016 | Mogle | F41A 21/02 |
| 2017/0184367 A1 | 6/2017 | Odle et al. | |
| 2017/0261280 A1 * | 9/2017 | Glisovic | F41A 21/24 |
| 2017/0286654 A1 * | 10/2017 | Nicoll | F41A 17/063 |
| 2018/0023913 A1 * | 1/2018 | Newman | F41A 21/02 42/76.1 |
| 2018/0142980 A1 | 5/2018 | Caravaggi et al. | |
| 2018/0195832 A1 | 7/2018 | Faxon | |
| 2018/0202736 A1 | 7/2018 | Teetzel et al. | |
| 2019/0011208 A1 | 1/2019 | Teetzel et al. | |

FOREIGN PATENT DOCUMENTS

| | | | | |
|---|---|---|---|---|
| DE | 102009030862 B3 * | 11/2010 | | F41A 21/32 |
| DE | 102015001413 A1 * | 8/2016 | | G01P 3/665 |
| EP | 1530049 A1 * | 5/2005 | | F41A 21/32 |
| EP | 1956335 A2 * | 8/2008 | | F41A 21/32 |
| KR | 20140087302 A * | 7/2014 | | F41A 21/32 |

* cited by examiner

SENSOR SYSTEM FOR ADVANCED SMART WEAPONS BARRELS

CROSS-REFERENCE TO RELATED APPLICATION

This application is related to U.S. provisional application Nos. 62/446,222 filed Jan. 13, 2017 and 62/513,738 filed Jun. 1, 2017. Each of the aforementioned applications is incorporated herein by reference in its entirety.

BACKGROUND

The present invention relates to a smart barrel system for a firearm.

Supervisory personnel and operators of firearms or other weapons may need or desire to track, collect, and/or analyze various data and metrics regarding such weapons and their use. Certain data and metrics may be collected manually or through external devices. Such collection and analysis have the disadvantage of requiring additional time and devices and leave room for human error.

The present disclosure contemplates a new and improved barrel system that allows for collection and analysis of weapons usage data and maintenance management without the need for an external data collection and analysis device or system.

SUMMARY

The presently contemplated smart barrel system is designed to measure and record any number of barrel metrics, such as round count, projectile velocity, rate of fire, harmonics, etc., and to predict future firearm maintenance needs based on past operation. It will be recognized that the present development is not limited to use with weapons of any particular type, size, munitions type, or caliber.

In one aspect, a sensor system for advanced smart weapons barrels includes one or more sensors, the sensors connected to a processor by way of conductive elements. The smart weapons barrel system may include one or more barrel segments, such segments being removably attached to each other.

In certain embodiments, the sensors are positioned along the barrel segments and generate an electrical signal in response to a projectile being fired by the host firearm as the projectile moves past the respective sensor. The processor receives raw data from the sensor signal and may extrapolate and/or calculate further information in order to determine any number of a variety of metrics or other data analysis, including, but not limited to, round count, projectile velocity, rate of fire, etc.

In certain embodiments, the data collected stays with the barrel, whether or not the barrel is attached to the host weapon. In certain embodiments, the data can sent to a ballistics solver, wherever it might reside. Exemplary ballistics solvers include RAPTAR™ (Wilcox Industries Corp.), KESTREL™ (Nielsen-Kellerman Company), and others. In certain embodiments, the stored data may be relevant to care and custody of the weapon. In certain embodiments, the smart barrel system herein maintains a historical record of when the weapon was fired.

In certain embodiments, the sensor data collected by a microprocessor on the barrel is transmitted via a radio frequency (RF) transmitter, such as a Bluetooth transceiver, Wi-Fi module, etc., to a cellular phone, mobile device, smart watch, weapon mounted display, heads up display, hear worn display, network router, and so forth. The RF transmitter may be a module of the processing electronics which resides on the barrel. Alternatively, the RF transmitter may be a module such as a Bluetooth module associated with another processor-based information handling system associated with the firearm and in communication with the microprocessor on the barrel.

In certain other embodiments, the processor is an application-specific integrated circuit (ASIC) processor. The ASIC processor may be used with a single barrel or with any number of segments. The ASIC processor may receive and collect data from a number of different types of sensors, including a thermocouple. Alternative temperature sensors may be employed. Collecting and storing information pertaining to the rate of creation of barrel wear, allows for improved estimation of barrel wear and predicted future maintenance requirements.

In one aspect, a smart barrel system for firearm comprises a barrel segment comprising a tubular member having an axial bore, a proximal end, and a distal end. One or more sensors are disposed on the barrel segment and a processor is operatively connected to the one or more sensors by one or more conductive elements.

In a more limited aspect the one or more sensors are selected from the group consisting of piezoelectric transducers, strain gauge sensors, Hall effect sensors, pressure transducers, 2-axis accelerometers, 3-axis accelerometers, temperature transducers, and any combination of the foregoing.

In another more limited aspect, the one or more sensors include a plurality of sensors which are positioned at predetermined locations along the barrel segment, wherein the predetermined locations are encoded in the processor.

In another more limited aspect, at least one of the plurality of sensors is configured to generate an electrical signal in response to a projectile fired by the firearm passing through the barrel segment, and wherein the processor is configured to receive the electrical signal.

In another more limited aspect, the one or more sensors includes a plurality of sensors spaced along the barrel segment in known spatial relationship for detecting signals representative of any one or more of a velocity of the projectile, a number of rounds fired by the firearm, and a rate of fire of the firearm.

In another more limited aspect, the one or more sensors are configured to generate an electrical signal representative of one or more smart barrel system parameters.

In another more limited aspect, the smart barrel system further comprises an electronic memory associated with the processor for storing data representative of the one or more smart barrel system parameters.

In another more limited aspect, the smart barrel system further comprises a display for displaying the one or more smart barrel system parameters in human viewable form.

In another more limited aspect, the barrel segment further comprises an outer layer disposed over at least a portion of the tubular member, and wherein the processor, one or more sensors, and conductive elements are embedded in the outer layer.

In another more limited aspect, the outer layer is selected from the group consisting of a fiber wrap impregnated with a polymer resin and a potting compound.

In another more limited aspect, the smart barrel system further comprising an interface connection on the barrel segment and coupled to the processor by the one or more conductive elements.

In another more limited aspect, the interface connection provides an electrical connection between the processor and an external power supply.

In another more limited aspect, the barrel segment further comprises a machined cavity formed near the proximal end of the barrel segment and one or more vias formed in the barrel segment, the vias connecting to the machined cavity, wherein the conductive elements pass through the vias in the barrel segment to connect the processor and the one or more sensors.

In another more limited aspect, the smart barrel system further comprises an upper receiver removably attached to the barrel segment via a barrel nut assembly.

In another more limited aspect, the conductive elements further comprise one or more external contact points configured to mate with corresponding external connectors on the upper receiver.

In another more limited aspect, the processor is an application-specific integrated circuit (ASIC) processor.

In another more limited aspect, the ASIC processor is disposed on a ceramic substrate.

In another more limited aspect, the one or more sensors includes a thermocouple for outputting a signal representative of a temperature of the barrel segment.

In a further aspect, a smart barrel system for firearm comprises a first barrel segment and a second barrel segment, each barrel segment comprising a tubular member having an axial bore, a proximal end, and a distal end. The proximal end of the first barrel segment has a first threaded element for removably attaching the first barrel segment to the firearm and the distal end of the first barrel segment has a second threaded element. The proximal end of the second barrel segment has a third threaded element which is complementary with the second threaded element, the third threaded element for removably attaching the second barrel segment to the first barrel segment. A plurality of sensors include one or more sensors disposed on the first barrel segment and one or more sensors disposed on the second barrel segment. A processor is operatively connected to the plurality sensors by a plurality of conductive elements.

In more limited aspect, the processor is disposed on the first barrel segment and the smart barrel system further comprises a barrel nut assembly for removably attaching the proximal end of the first barrel segment to a receiver of firearm, the barrel nut defining an interface between the processor and further processing electronics disposed on the firearm.

In another more limited aspect, at least a portion of the plurality of electrical conductors pass through at least a portion of the first barrel segment, the second barrel segment, or both.

In another more limited aspect, at least a portion of the plurality of electrical conductors are insulated with ceramic insulator sleeves.

In another more limited aspect, the plurality of sensors are selected from the group consisting of piezoelectric transducers, strain gauge sensors, Hall effect sensors, pressure transducers, 2-axis accelerometers, 3-axis accelerometers, temperature transducers, and any combination of the foregoing.

In another more limited aspect, the first barrel segment has a first externally upset portion adjacent the second threaded element and the second barrel segment has a second externally upset portion adjacent the third threaded element. The first externally upset portion and the second externally upset portion abut each other when the first barrel segment is assembled to the second barrel segment, wherein at least a portion of the plurality of electrical conductors pass through the first barrel externally upset portion, the second externally upset portion, or both.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
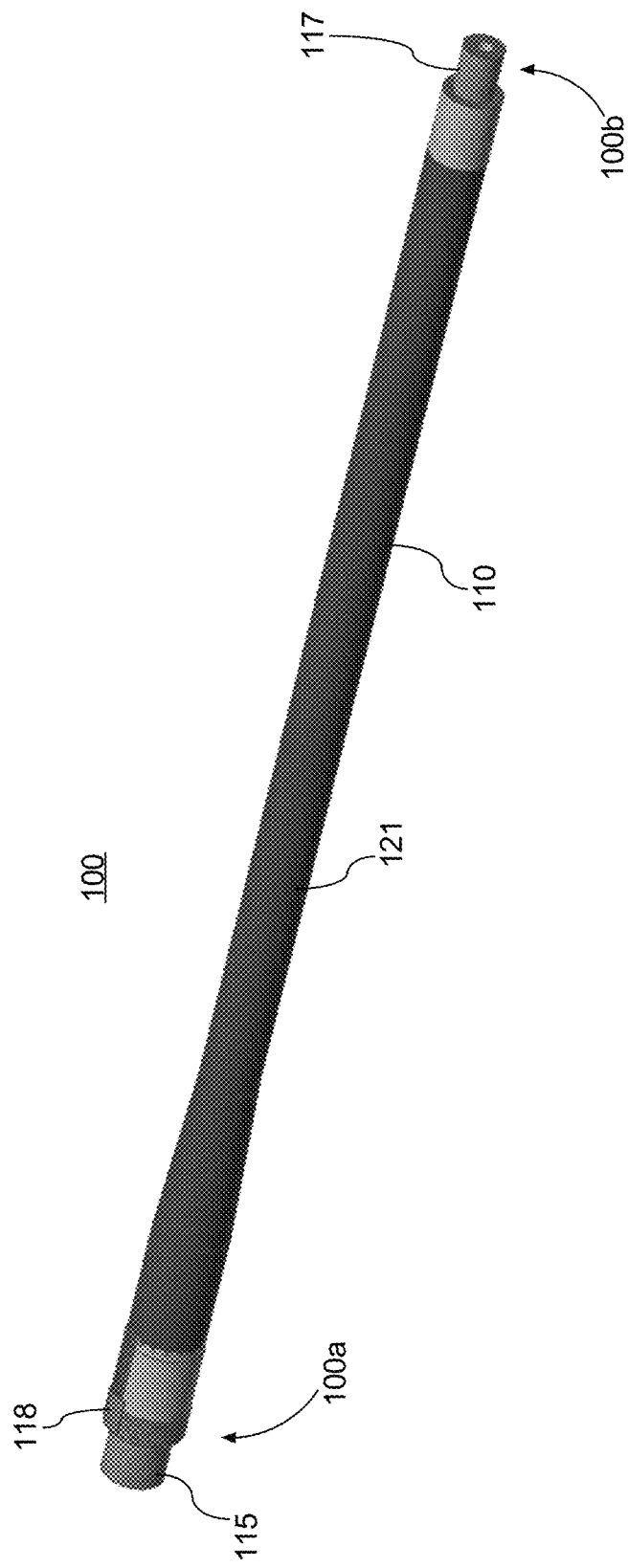
FIG. 1 is an isometric view of a firearm barrel with sensing system in accordance with a first exemplary embodiment.
Figure 2:
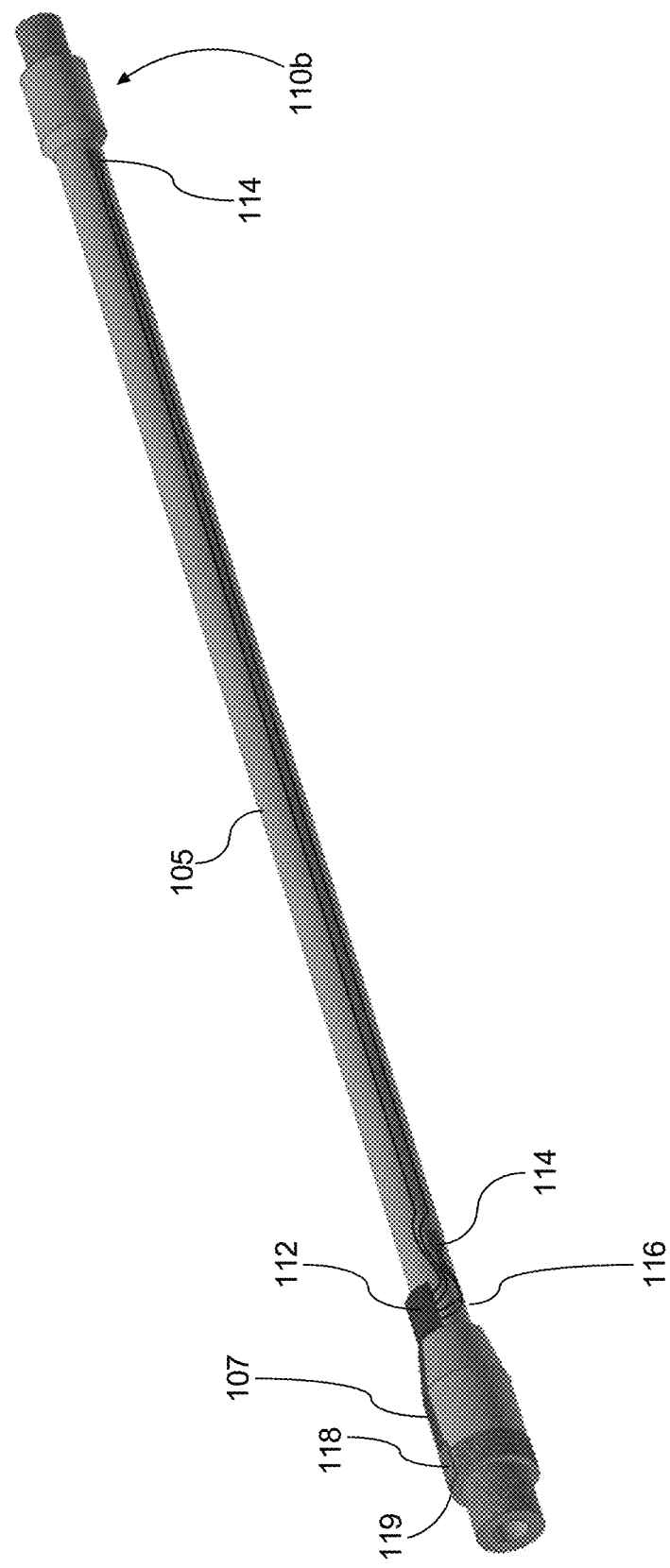
FIG. 2 is an isometric view of the barrel appearing in FIG. 1 without the potting.
Figure 3:
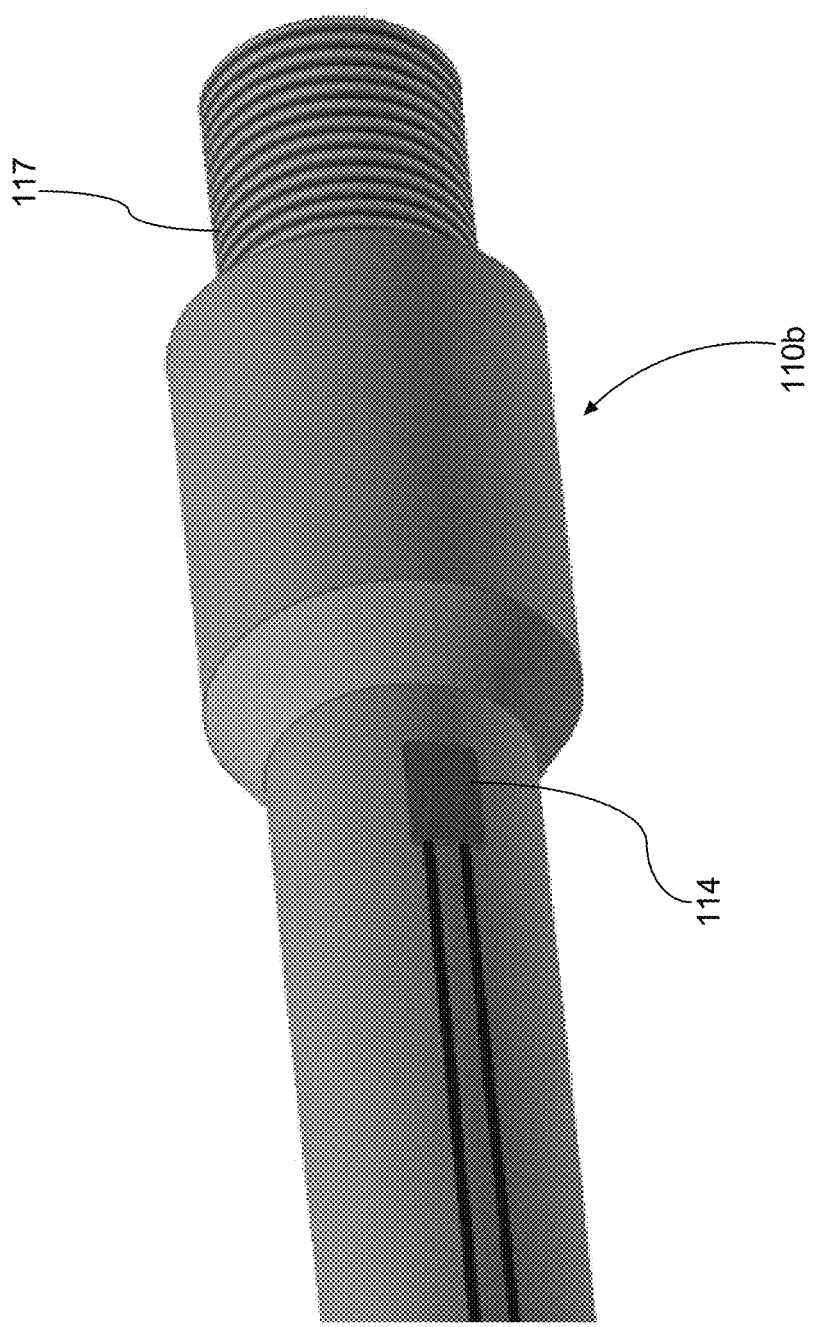
FIG. 3 is an enlarged fragmentary view of the breech end of the primary segment.
Figure 4:
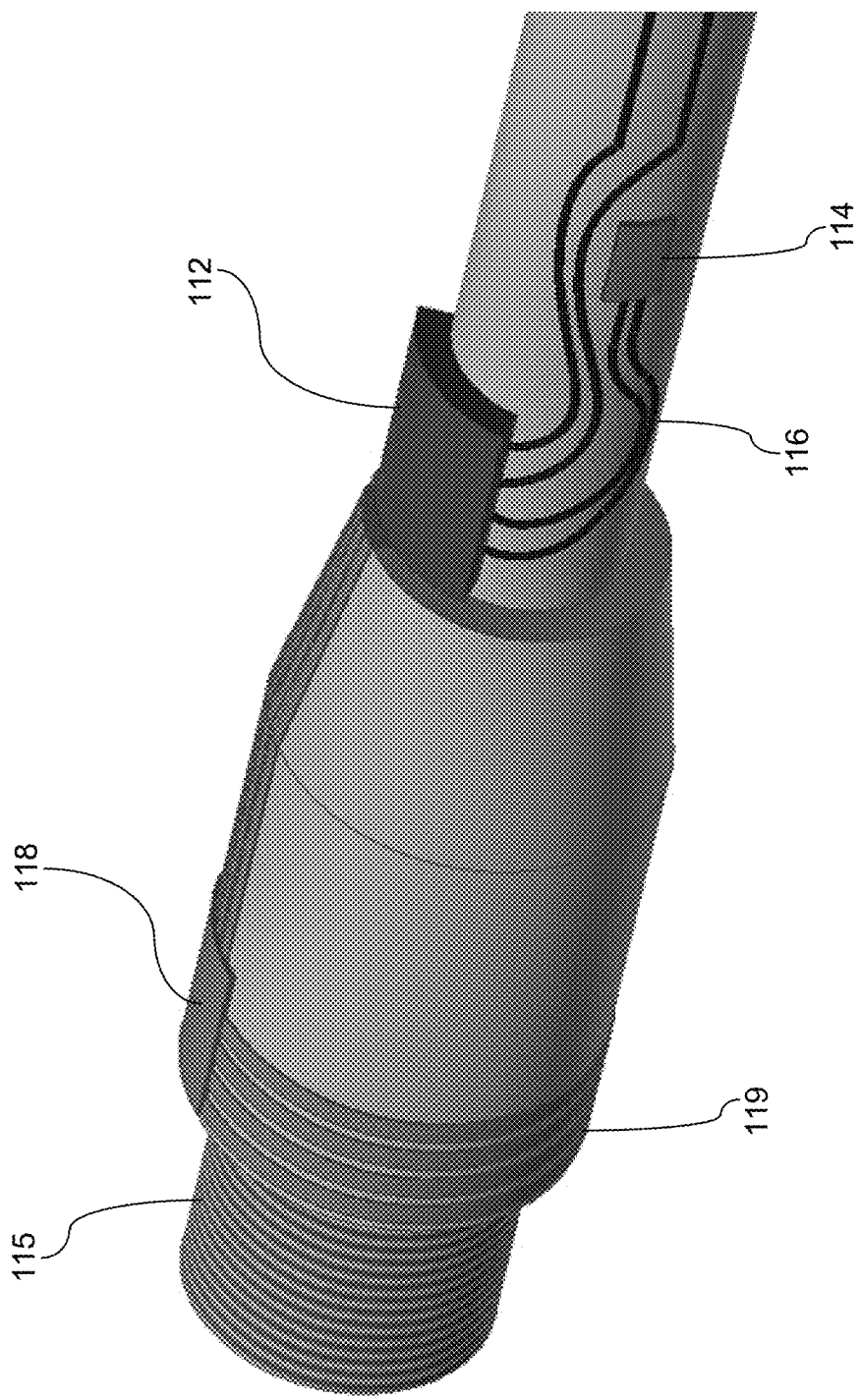
FIG. 4 is an enlarged view of the muzzle or exit end of barrel appearing in FIG. 1.
Figure 5:
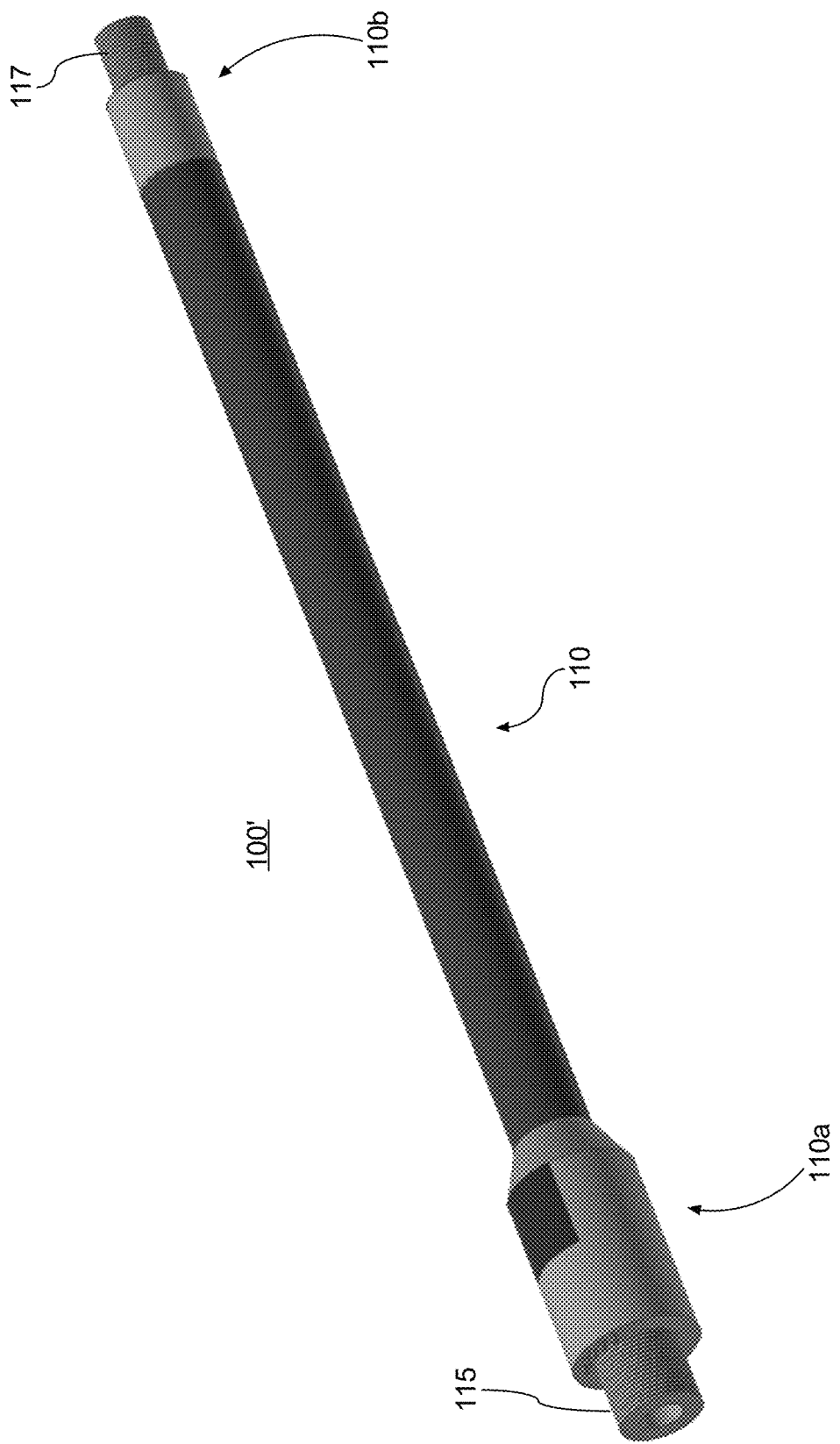
FIG. 5 is an isometric view of a firearm barrel with sensing system in accordance with a second exemplary embodiment.
Figure 6:
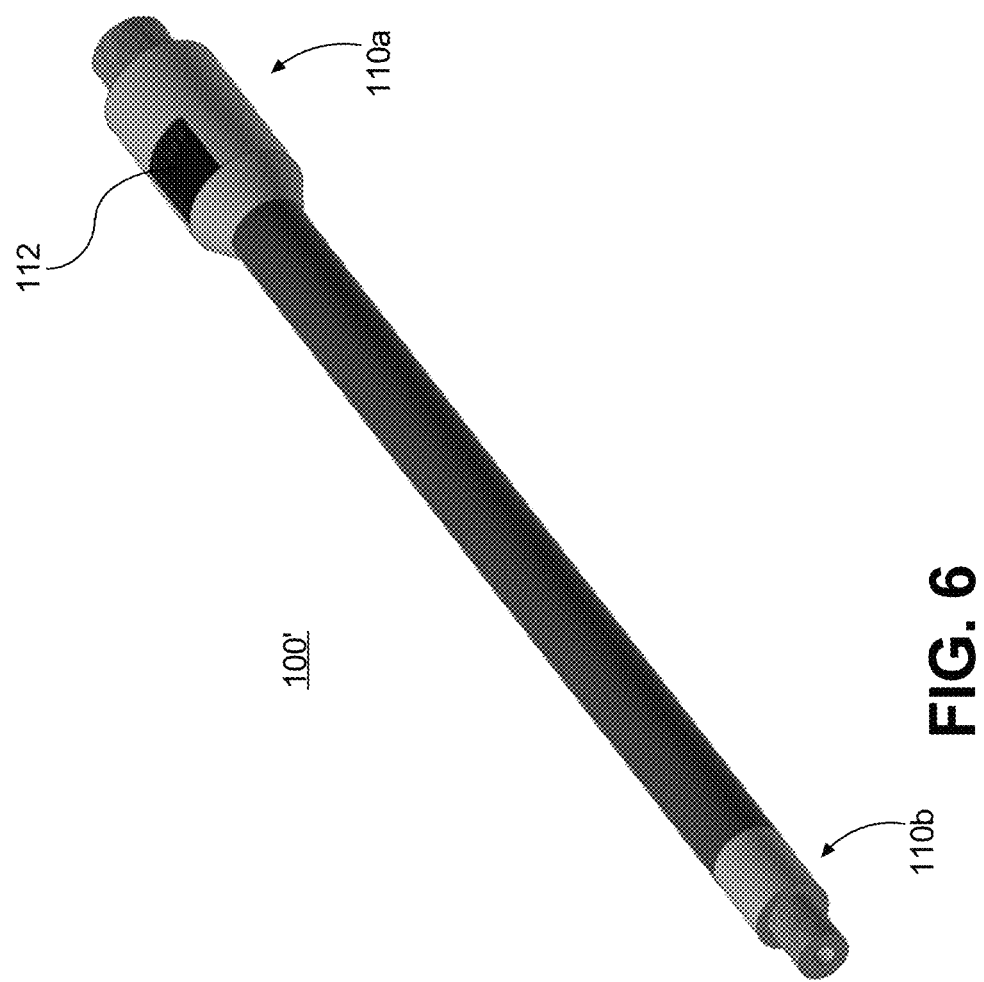
FIG. 6 is another isometric view of the barrel appearing in FIG. 5.
Figure 7:
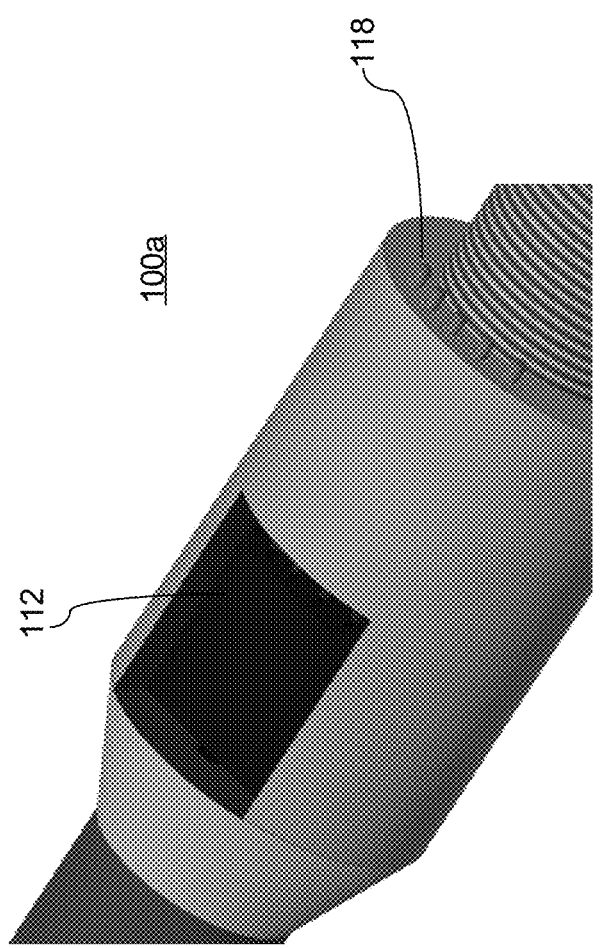
FIG. 7 is an enlarged view of the breech end of the primary segment.
Figure 8A:
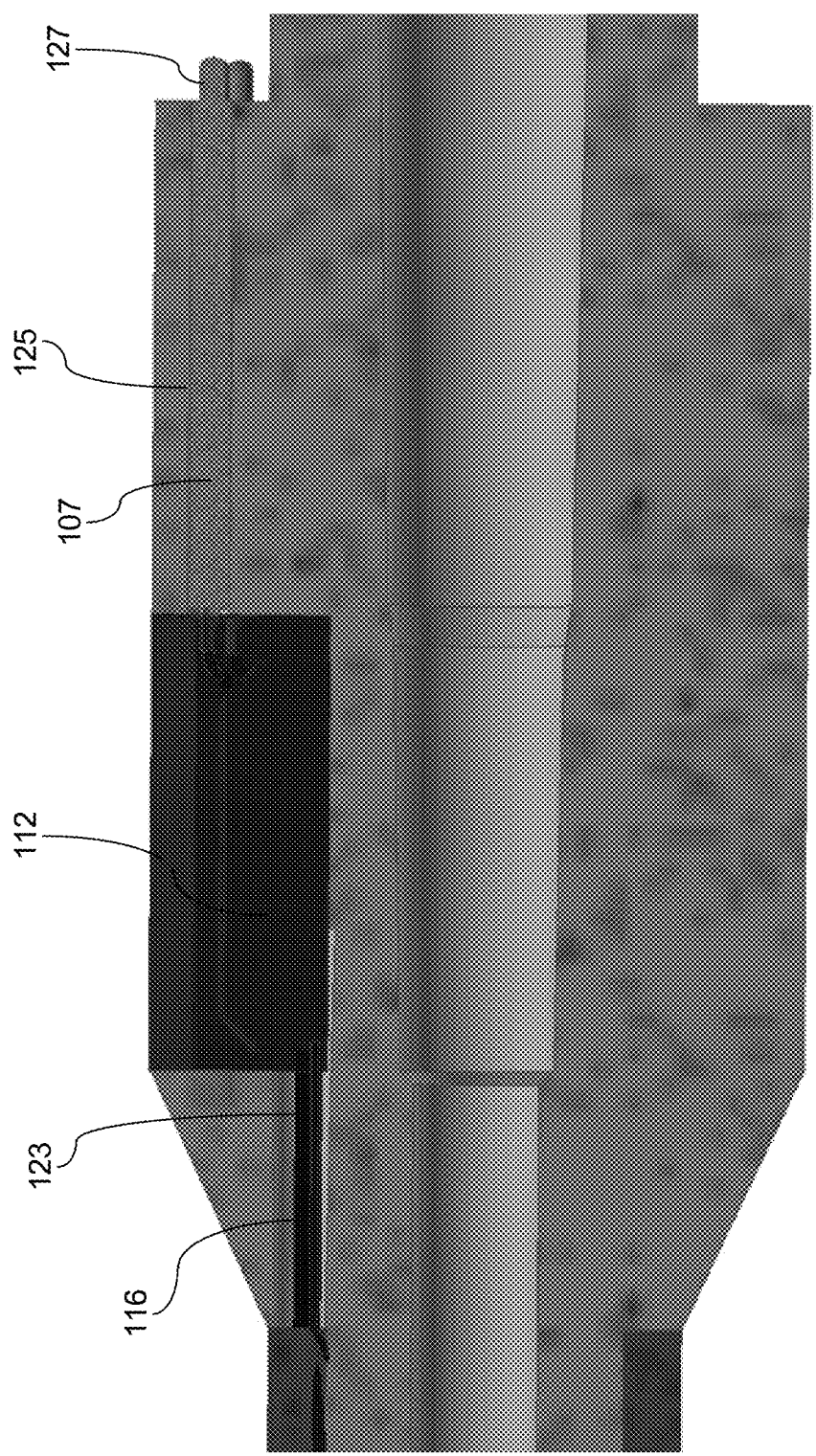
FIGS. 8A and 8B are enlarged, cross-sectional views of the proximal end of the barrel appearing in FIG. 5.
Figure 8B:
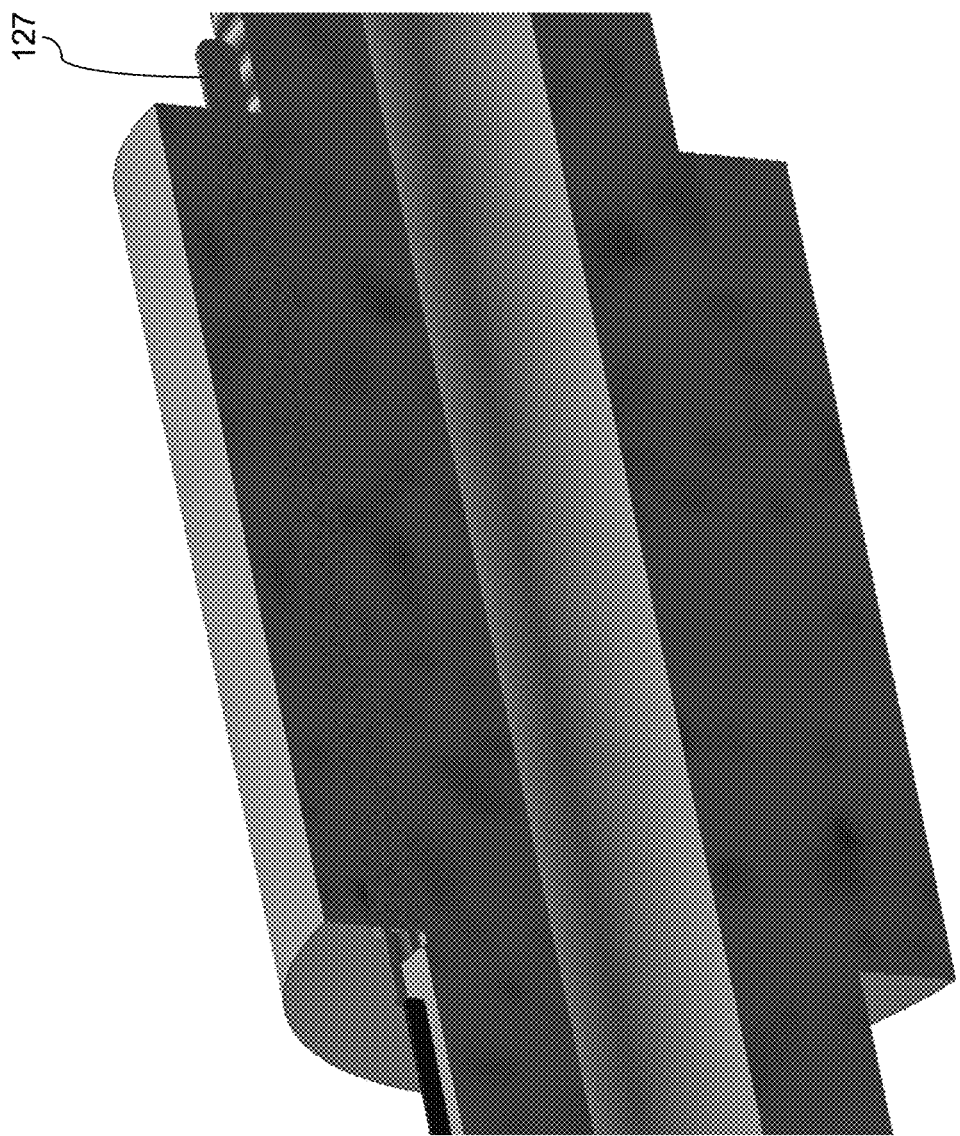
Figure 9:
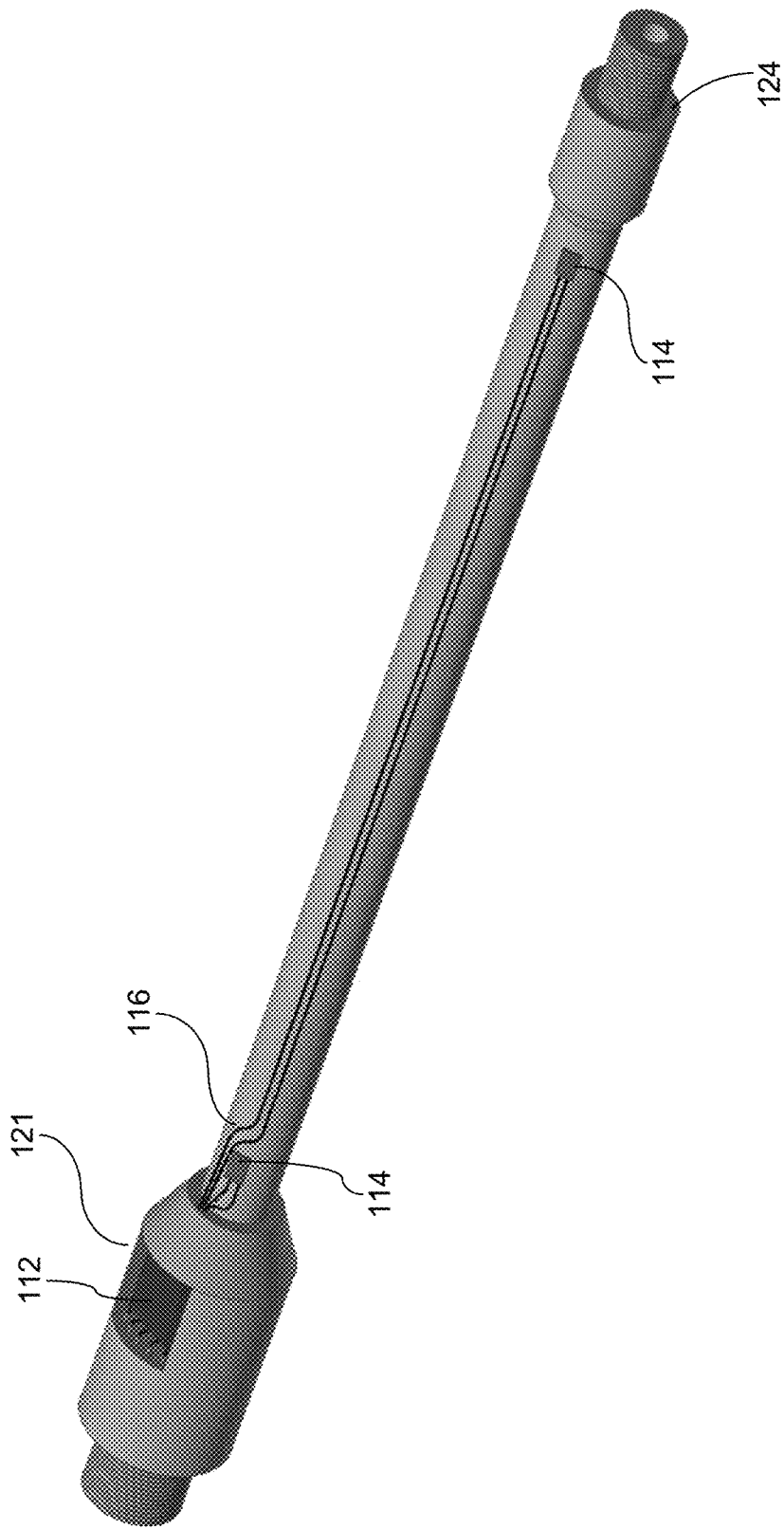
FIG. 9 is another isometric view of the barrel appearing in FIG. 5.
Figure 10A:
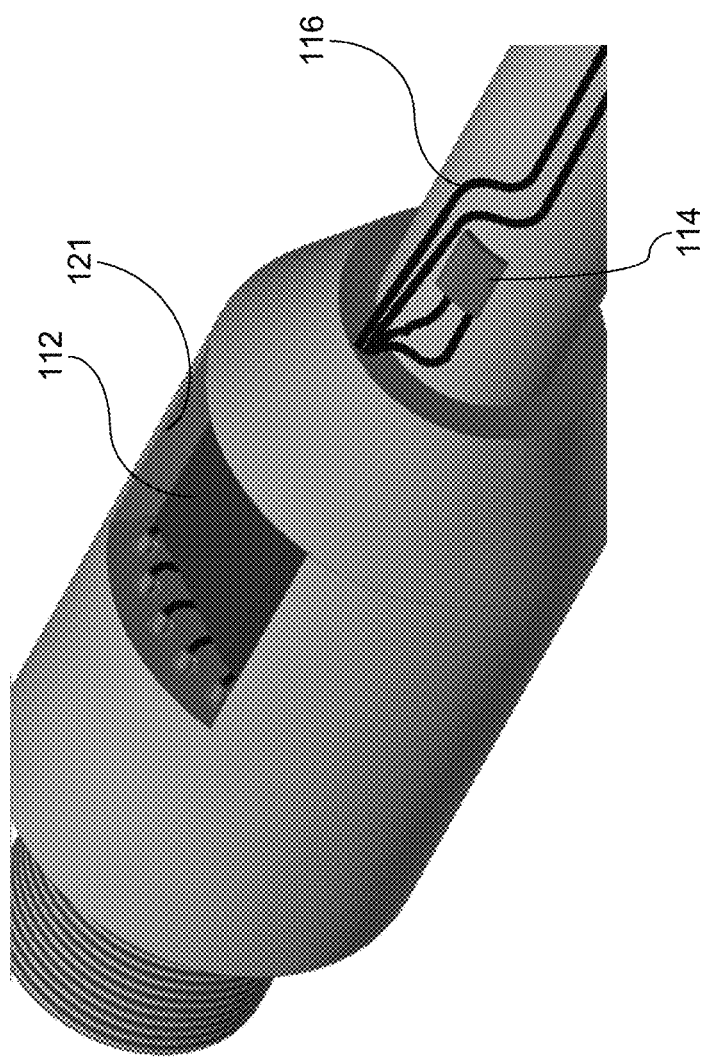
FIGS. 10A and 10B are enlarged views of the breech end of the barrel appearing in FIG. 5.
Figure 10B:
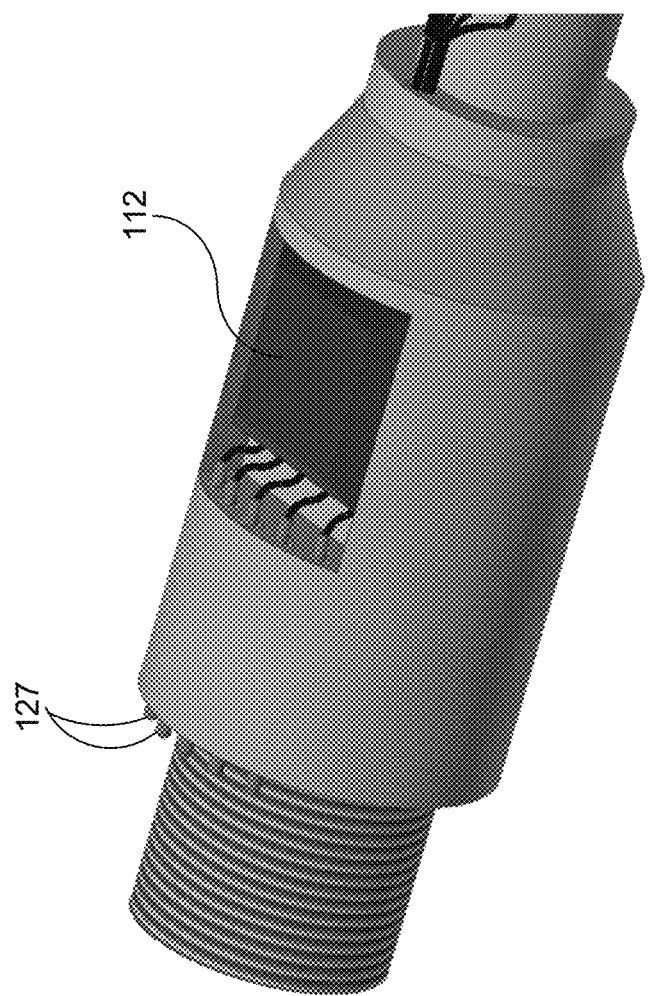
Figure 11:
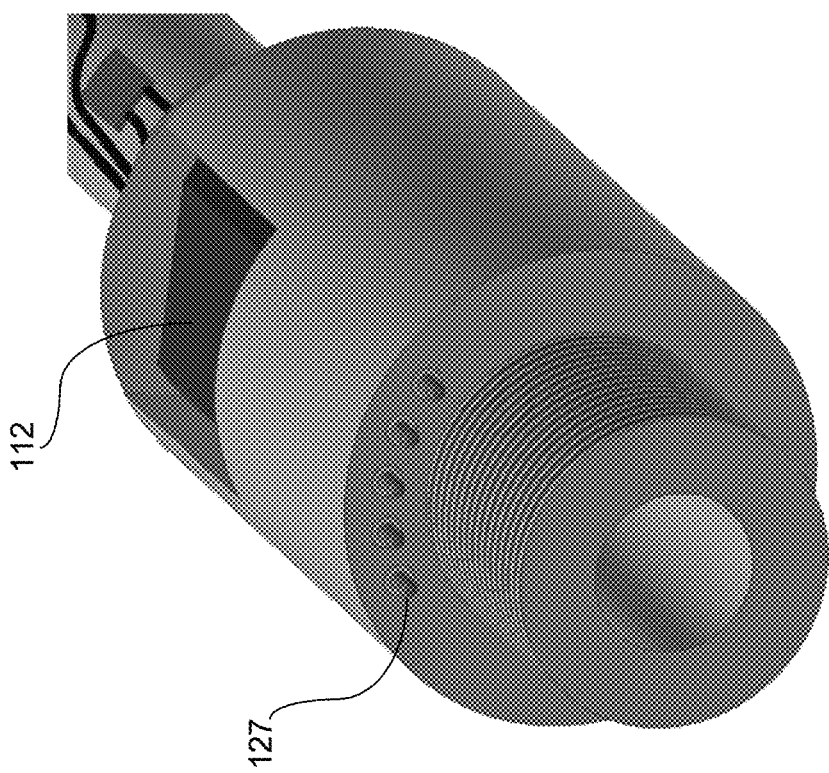
FIG. 11 is another view of the breech end of the barrel appearing in FIG. 5.
Figure 12A:
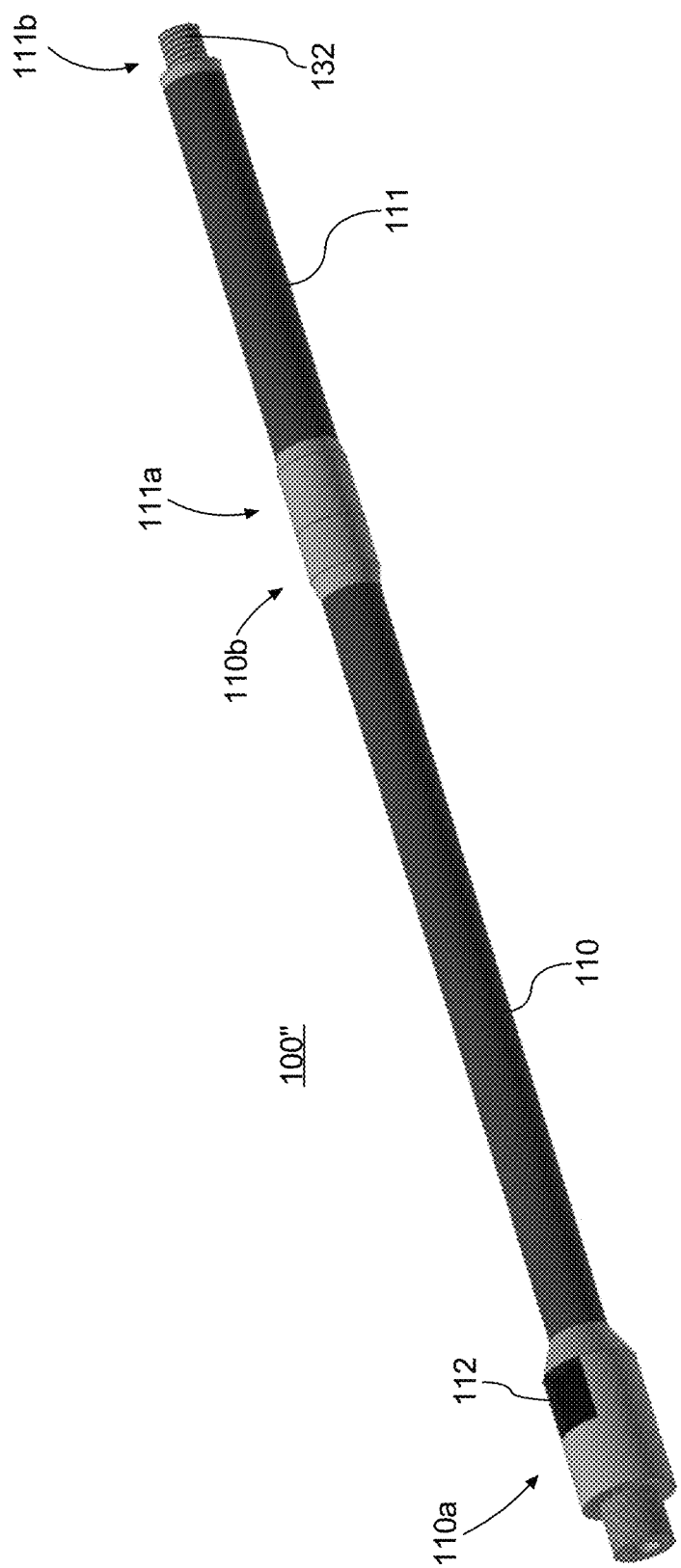
FIG. 12A is an isometric view of a modular barrel having an onboard data collection system in accordance with a third exemplary embodiment.
Figure 12B:
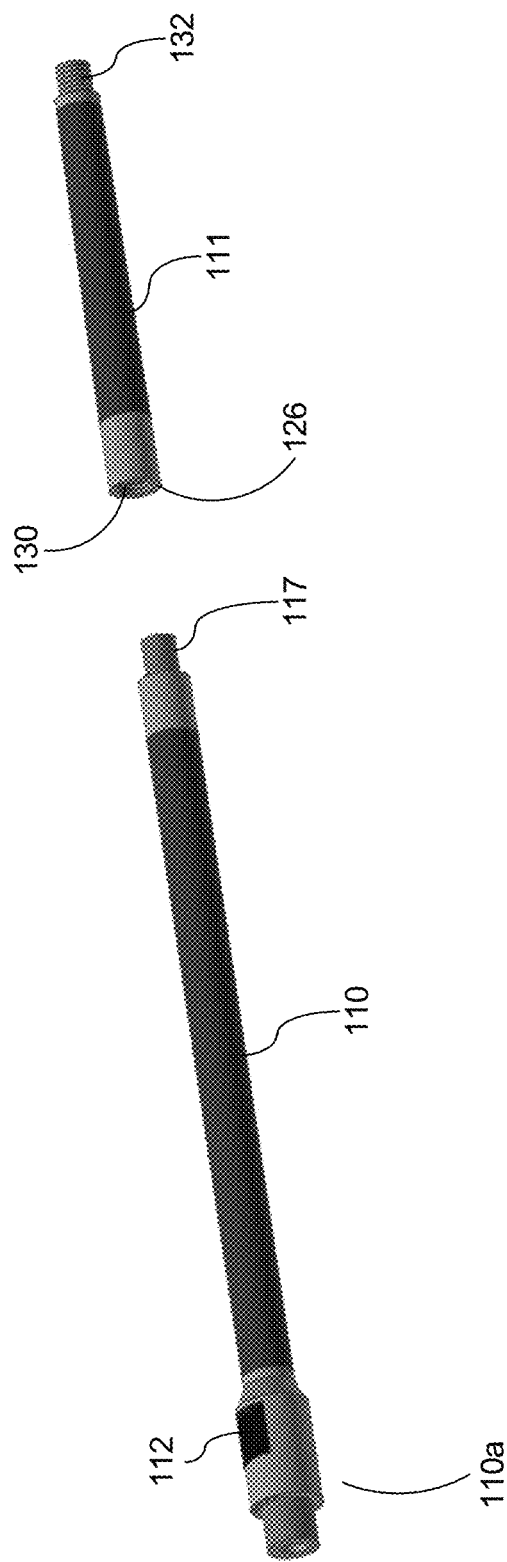
FIG. 12B is an exploded, isometric view of the modular barrel appearing in FIG. 12A.
Figure 13:
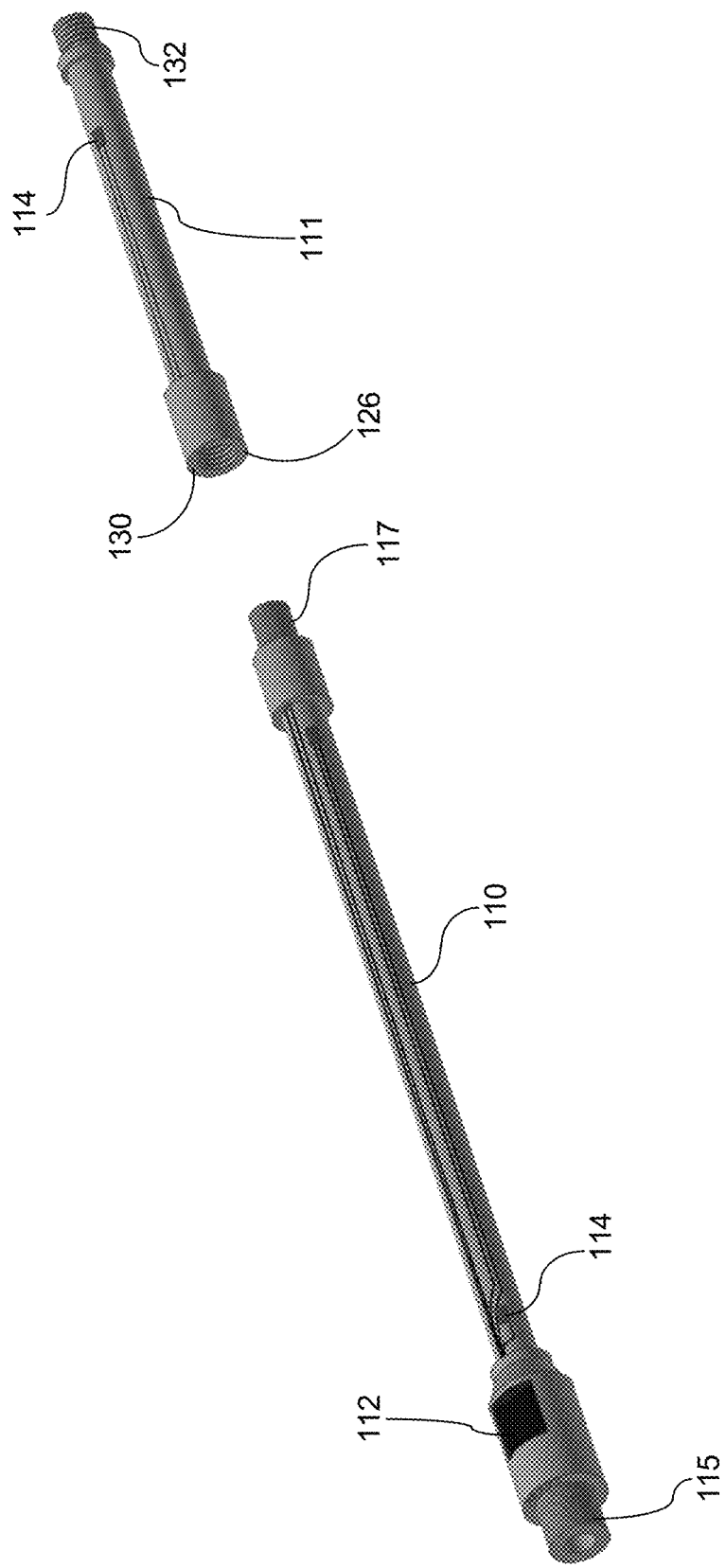
FIG. 13 is an isometric view of the modular barrel appearing in FIG. 12A with the potting removed.
Figure 14A:
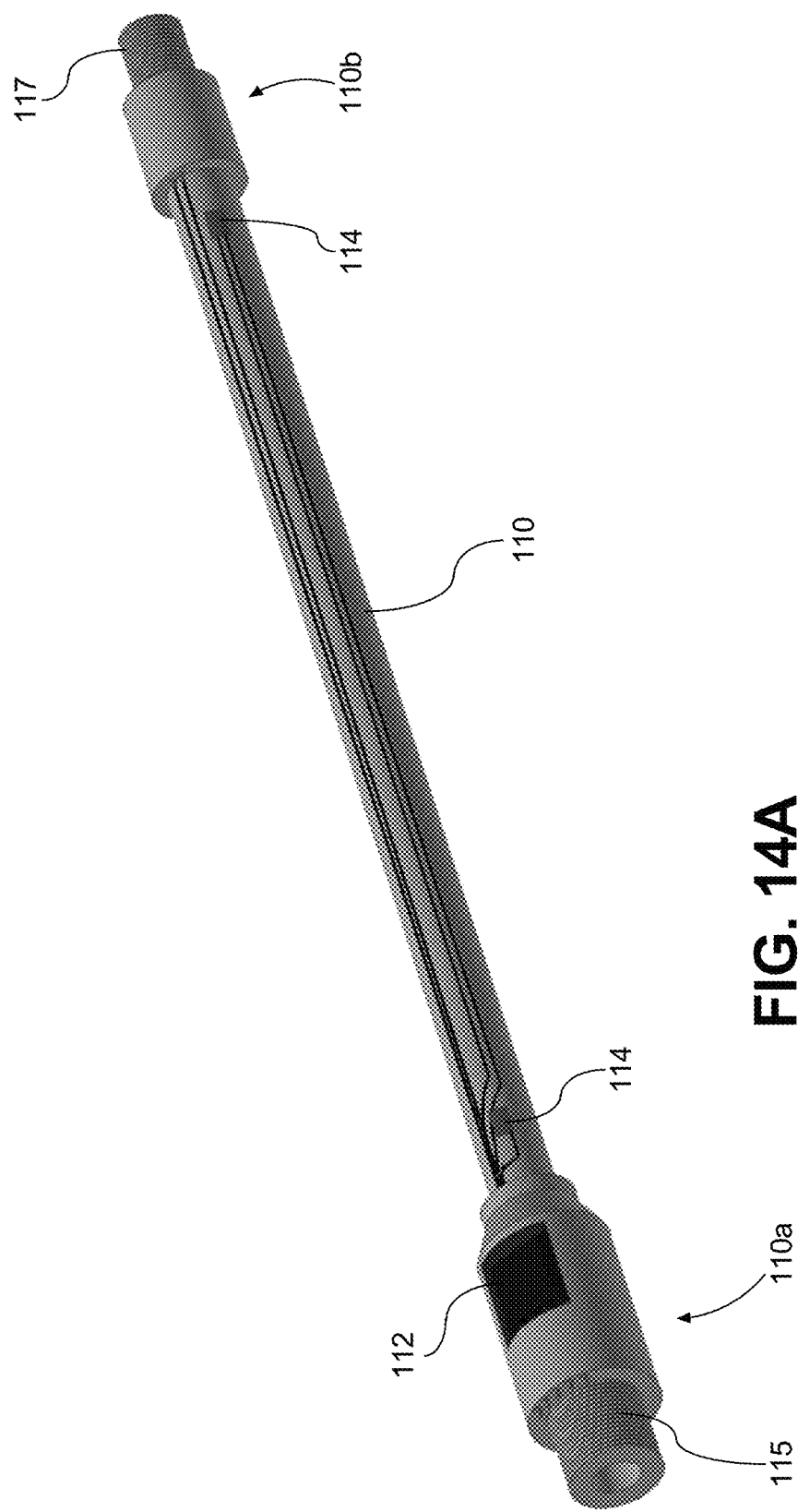
FIGS. 14A and 14B, respectively, are enlarged views of the primary and secondary modular barrel segments appearing in FIG. 13.
Figure 14B:
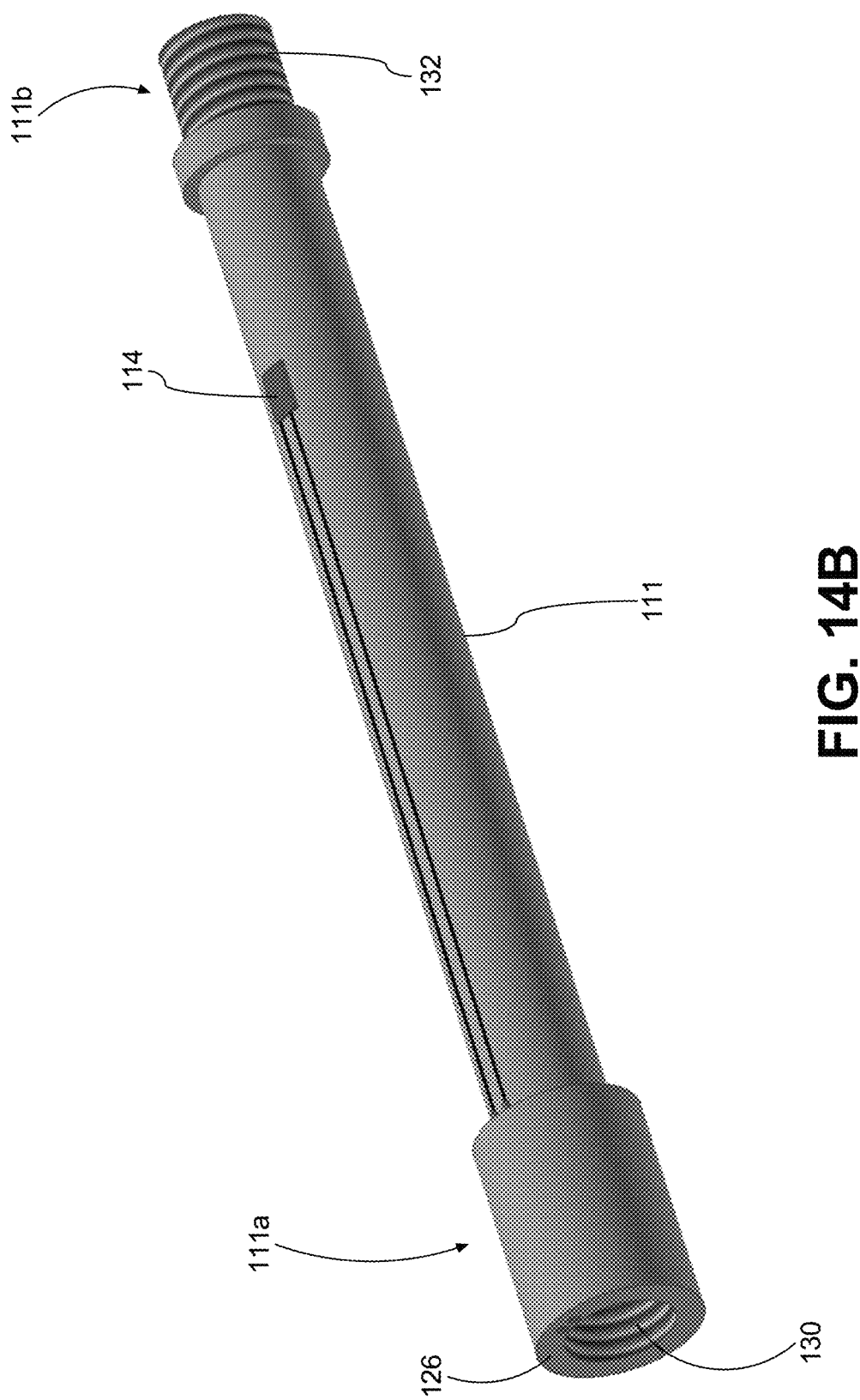
Figure 15:
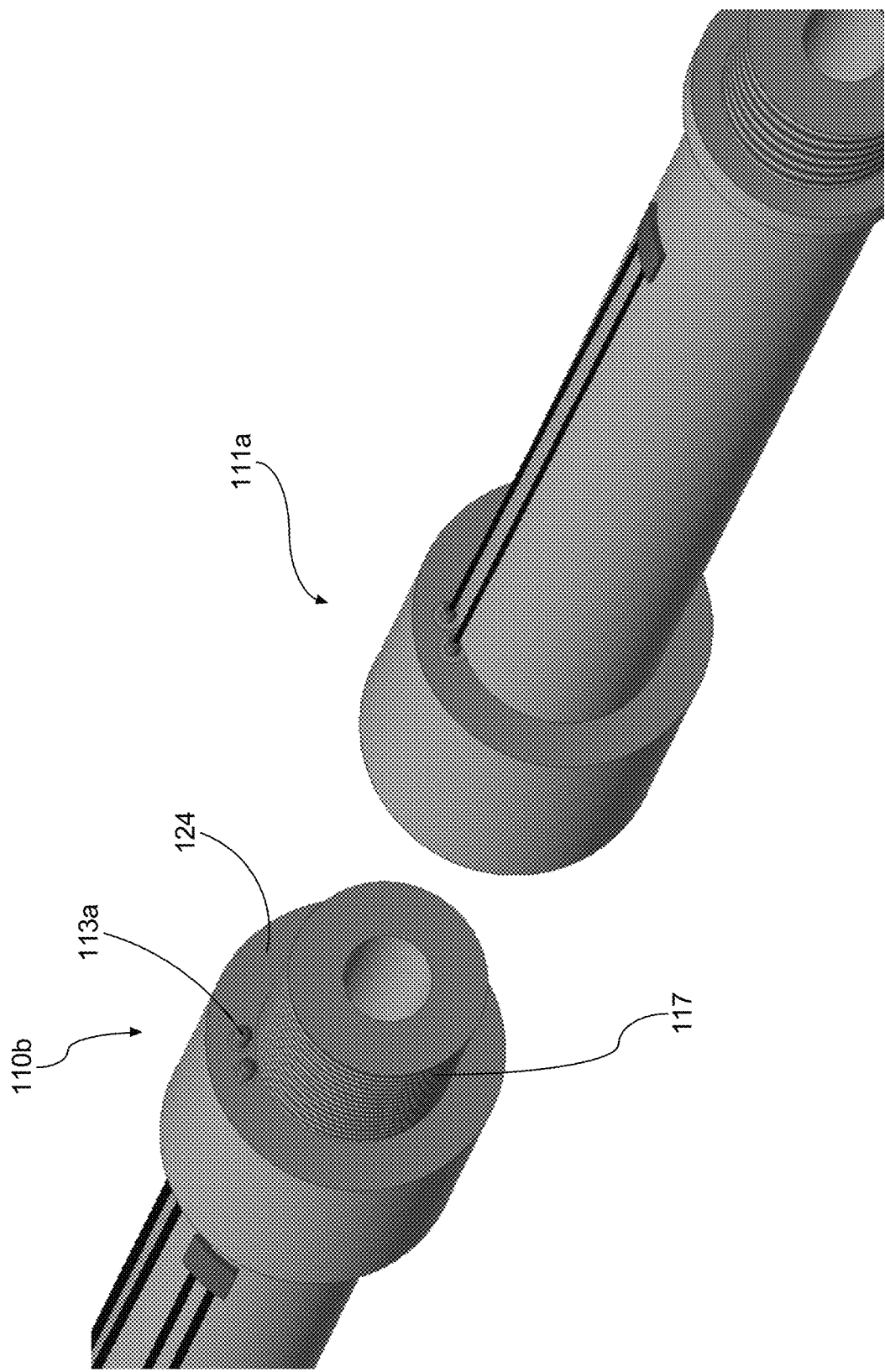
FIGS. 15 and 16 are enlarged exploded views of the joint between barrel segments showing the conductive elements for coupling a sensor a secondary segment of the modular barrel system to the processor residing on the primary segment.
Figure 16:
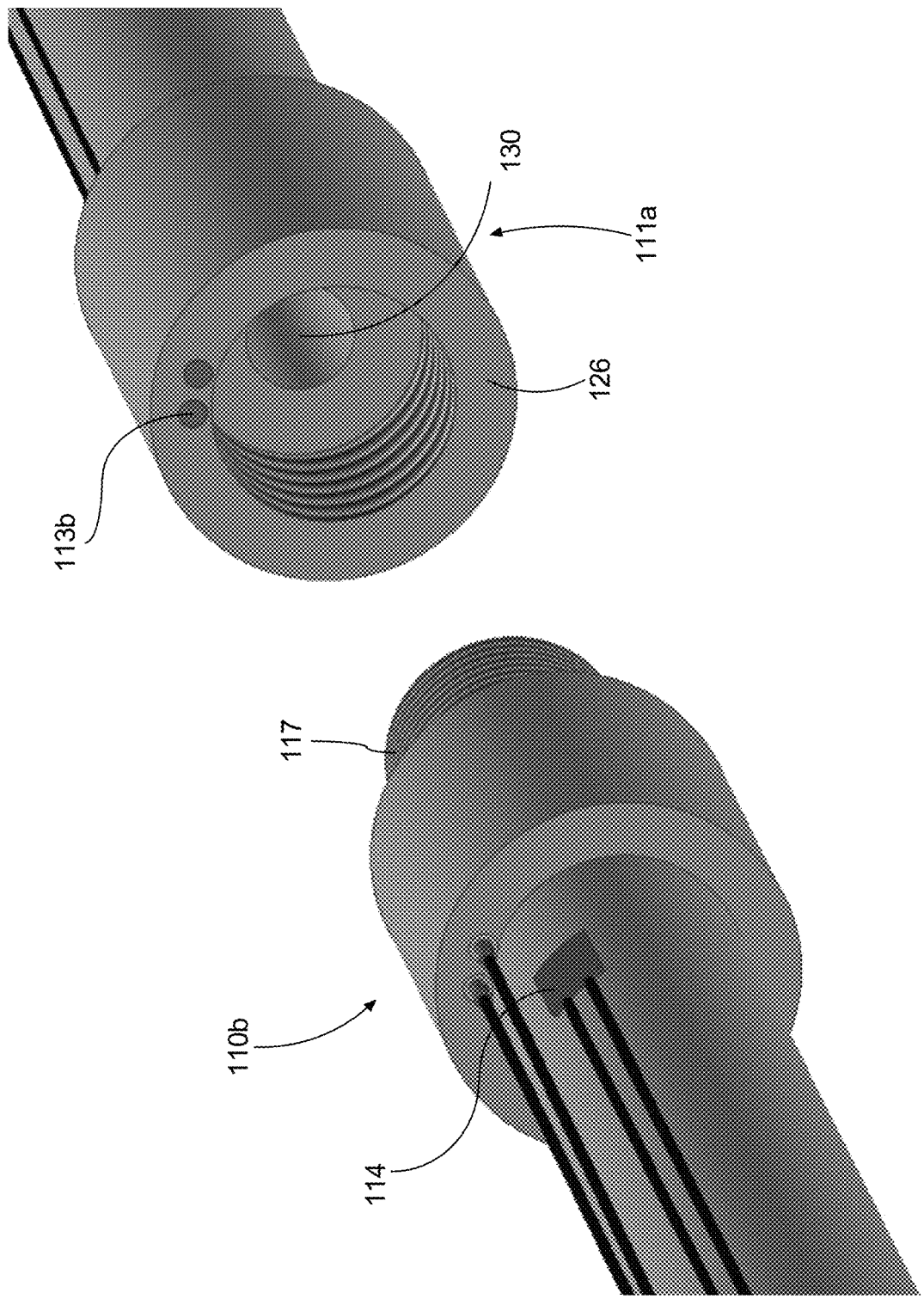

Referring now to the drawings, FIGS. 1-4 illustrate a smart barrel system 100 according to a first exemplary embodiment. The system 100 includes a barrel 110 having a breech end 110a and a muzzle or exit end 110b. The barrel 110 may be produced from any type of material suitable for firearm barrels, including steel alloys (e.g., chrome molly steel, stainless steel) and others.

The barrel 110 includes a reduced diameter or inset section 105 disposed between the ends 110a and 110b for mounting a processor 112, e.g., a microprocessor, and at least one sensor 114. In certain embodiments, a plurality of sensors, e.g., 2, 3, up to N sensors may be provided along the axial length of the barrel. The sensor(s) 114 may detect any number of variables representative of one or more or barrel conditions or parameters. In certain embodiments, each sensor 114 detects the passing of a projectile, e.g., a bullet within the barrel. The sensors 114 may each be of any style of sensor which is able to generate an electrical signal responsive to the passing of a projectile through the barrel, including piezoelectric transducers or strain gauges, Hall effect sensors, pressure transducers, 2 or 3 axis accelerometers, temperature transducers, and others.

The sensors 114 are connected to the microprocessor 112 by way of conductive elements 116 which may be a wire harness, ribbon or other cable, individual conductors, conductive traces, e.g., printed traces, supported on a dielectric substrate, and so forth. In certain embodiments, the sensors 114 are positioned along the barrel segments 110, 111 in precise, predetermined locations on the barrel, which positions are encoded in the microprocessor 112. The conductive elements 116 connect each embedded sensor 114 to the embedded microprocessor 112.

In certain embodiments, the sensor 114 generates an electrical signal in response to of a projectile fired by the firearm as it moves past the sensor. Each time a round is fired, the microprocessor 112 receives the signal from the sensor 114 and records the event. In certain embodiments, the microprocessor 112 analyzes and extrapolates from the raw data generated by the sensor 114 to determine any of a variety of metrics or other data analysis, including but not limited to round count, projectile velocity, and rate of fire, among others. The microprocessor 112 may be programmed to provide any number of calculations, interpret data, and store or output desired metrics. In certain further embodiments, such metrics or data analysis may be processed and stored in an electronic memory associated with the microprocessor 112 and/or displayed to the operator. In certain embodiments, the electronic memory is a nonvolatile memory which retains its state in the absence of a power supply.

In preferred embodiments, the smart barrel 100 has a plurality of sensors 114 spaced along its length for detecting projectile velocity in addition to round count and rate of fire. Again, each sensor 114 may be of any style of sensor which is able to detect the passing of a projectile, including a piezoelectric strain gauge, Hall effect sensor, pressure transducer, accelerometer, and others.

In certain embodiments, the microprocessor 112, sensors 114, and associated conductive elements 116 are embedded in the barrel inset portion 105. The microprocessor 112, sensors 114, and conductive elements 116 may be embedded in a semi-permanent or permanent method under an outer layer 120. The outer layer may be a potting compound. Alternatively, the outer layer may be a wrap comprising a fiber (e.g., carbon fiber) material (mat, fabric, etc.) impregnated with a polymer resin such as an epoxy resin, or other appropriate material. In alternative embodiments, the microprocessor 112 may be external to the barrel system, e.g., disposed on another portion of the firearm, such as a receiver portion of the firearm.

The sensors 114 send one or more raw signals to the microprocessor 112, which translates the signals and generates one or more designated metrics, e.g., round count, rate of fire, velocity, barrel harmonics, etc.

An interface connection 118 is provided on the barrel and is coupled to the microprocessor 112 via conductive elements 107. In certain embodiments, the interface connection 118 provides both a power bridge to an external power supply and a data communication between the processor 112 and output device. In certain embodiments, the output device may be a viewable display. In certain embodiments, the output device may be a processor-based information handling system which may provide further processing or analysis of the data recorded and output by the processor 112. The interface connection 118 may be any form of interface connector, including radial conducting bands 119 (e.g., supported on an insulating material), although other types of connections are contemplated, such as embedded spring pin contacts, terminated connectors, along with others.

In certain embodiments, the microprocessor 112 includes processing electronics and associated memory storage. In preferred embodiments, the microprocessor stores information in a non-volatile random access memory (RAM) including EPROM, EEPROM, flash memory, etc.

In certain embodiments, the microprocessor will collect and retain barrel metrics in a non-volatile RAM, such that stored data will be retained for the life of the barrel. For example, in certain embodiments, the operator will be able to view the metrics of the particular barrel 110, even if the barrel is employed on other firearm devices.

Referring now to FIGS. 5-11, there is illustrated another barrel system embodiment, designated 100', which is similar to the embodiment 100 described above, but wherein the processor 112 is disposed within a machined cavity 121 formed near the breech end of the barrel 110'. The sensors 114 and conductive elements 116 may be as described above. The conductive elements 116 pass through vias 123 in the barrel to electrically couple the sensors to the processor. Likewise, the conductive elements 107 for communicating power and signals between an external device (e.g., power supply, display device, or further information handling system) extend through vias 125 in the barrel and include external contacts, such as pins 127 or other type of terminals or contacts. The conductive elements 118 may include protruding pins 127 which may be configured to mate with aligned connectors on the upper receiver for communicating power and/or signals there through. In this manner the barrel processor 112 may communicate with a further processing system of the weapon.

FIGS. 12-16 and 22-28 illustrate a segmented barrel system 100" having with a primary segment 110 and a secondary segment 111. Although two segments are disclosed, it will be recognized that the modular smart barrel system contemplated herein may comprise any other number of segments, e.g., 3, 4, 5, or more.

Figure 34:
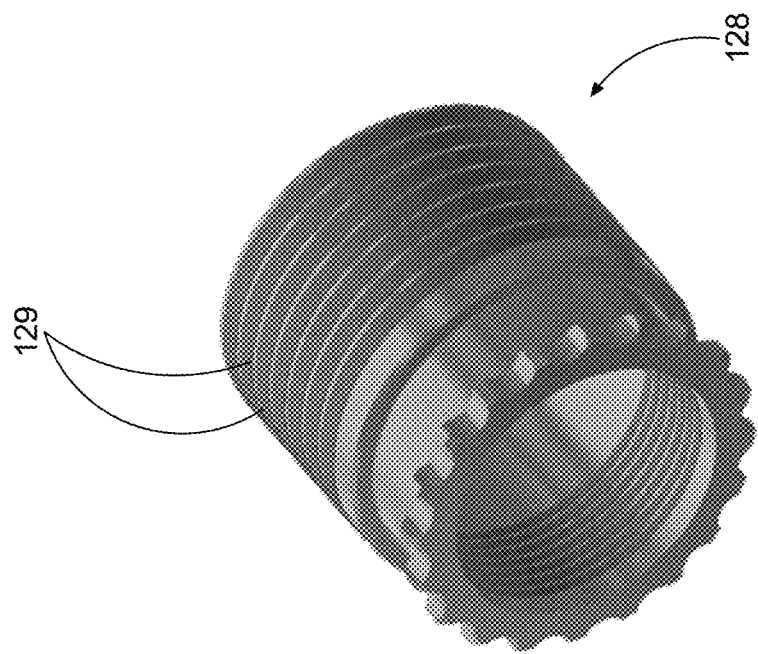
FIG. 34 is an enlarged view of an exemplary barrel nut assembly having integrated contact bands for transferring power and/or signal to the next level of processing.

The smart barrel system 100" has a primary segment 110 and a secondary segment 111. The primary segment 110 has a proximal or breech end 110a, which is adapted, e.g., via a threaded element 115, for attachment to a firearm, e.g., for attachment to an upper receiver of a firearm via a barrel nut assembly 128. The primary segment also has a distal end 110b, which may be configured for attachment to a proximal end 111a of the secondary segment 111. The secondary segment 111 also has a distal end, i.e., muzzle or exit end 111b. The barrel nut assembly 128 (see FIG. 34) may have integrated contact bands 129 to transfer power and/or signal to a processing unit providing a further level of processing.

The distal end 110b of the primary segment 110 is provided with a male threaded element 117 and the proximal end 110a of the primary segment is provided with a female threaded element 130 for coupling the primary segment 110 to the secondary segment 111. The female threaded element 130 mates with the male element 117, e.g., they are complementary in terms of their shape, arrangement, pitch and so forth.

In certain embodiments, each of the segments 110, 111 have at least one sensor 114, which are electrically coupled to the processor 112. The sensors communicate with the processor using conductive elements 116. In the multi-segment embodiment 100", the conductive elements 116 on one segment are electrically coupled using electrical conductors passing through vias at the barrel joint to the conductors on the segment 110 having protruding, e.g., biased, pins 113a, which mate with aligned electrical contacts pads 113b on the segment 111. For example, the barrel segments have upset (thickened) regions adjacent to the threaded joint and the vias may be drilled through such thickened region. In certain embodiments, the contacts 113a, 113b as well as conductive circuit elements passing through the barrel materials are electrically insulated from the barrel with ceramic insulator sleeves.

In certain embodiments, the processor is an application-specific integrated circuit (ASIC) processor 160. FIGS. 24-27B, 29, 31, and 34 illustrate a modular barrel system having a ceramic based ASIC processor 160 disposed within a machined cavity 121 formed near the breech end of the barrel 110. Although a modular barrel system is disclosed, it will be recognized that the ASIC processor 160 may be used with a single barrel or any number of segments, e.g., 3, 4, 5, or more. In the illustrated embodiment, the ASIC processor 160 is connected to a spring pin array 161 based in or disposed on a ceramic circuit substrate 162 (shown in FIG. 30). In certain embodiments, the ceramic substrate 162 is capable of withstanding temperatures up to 200° C. (500° F.). In certain embodiments, critical electronics are located above the barrel breech. In certain embodiments, all electrical connections of the ASIC are made by thermosonic wire bonding or gold tin solder.

Figure 27A:
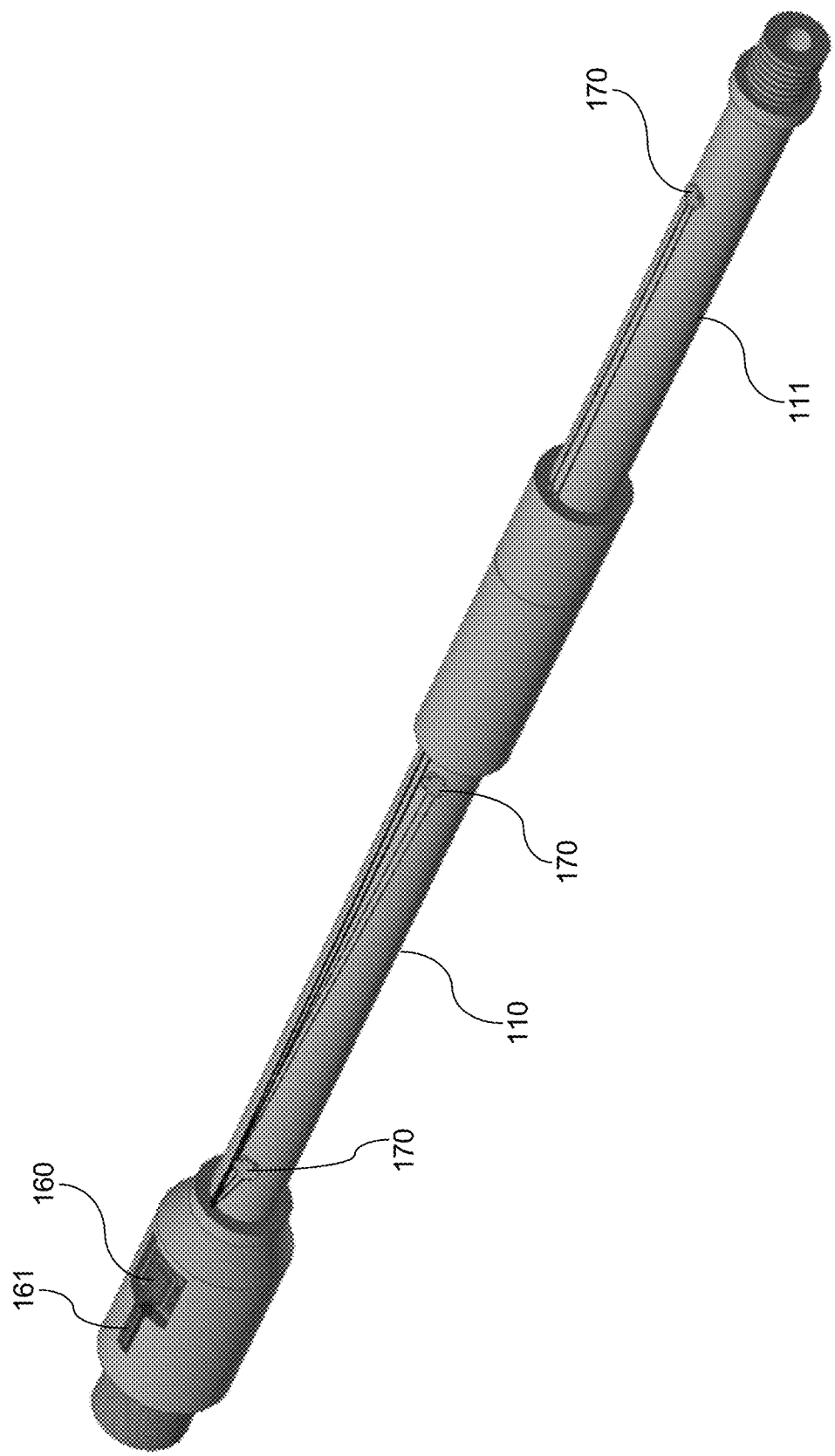
FIG. 27A is an isometric view of a modular barrel according to a further exemplary embodiment, with the potting removed, showing a plurality of pressure transducers spaced along its length.
Figure 27B:
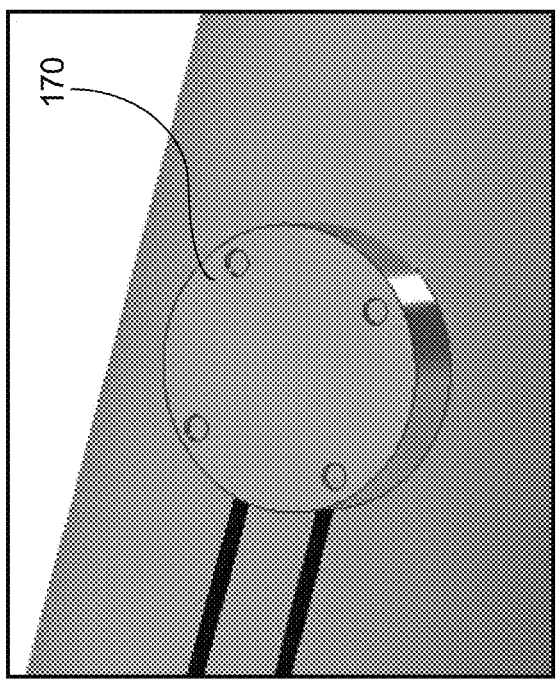
FIG. 27B is an enlarged view of an exemplary pressure transducer.
Figure 28:
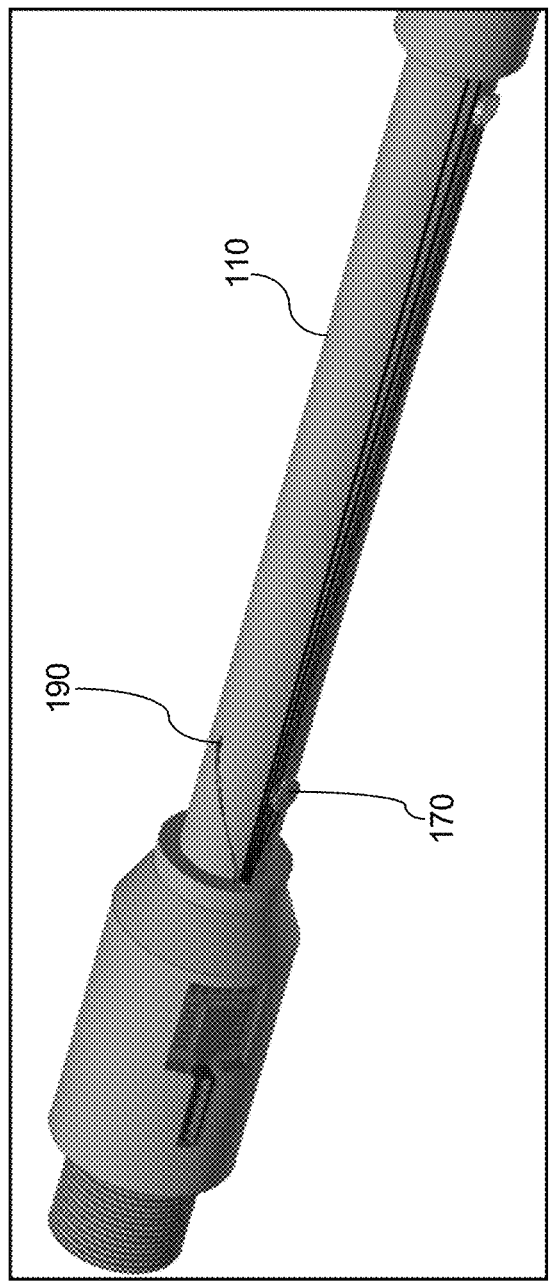
FIG. 28 is an enlarged view of the breech end of the primary barrel segment of FIG. 27A.

In certain embodiments, each of the segments 110, 111 have at least one piezoelectric sensor and/or pressure transducer 170, which are electrically coupled to the ASIC processor 160 (shown in FIGS. 27A-B, and 28). In certain embodiments, the wetted material of the pressure transducer is stainless steel, such as 15-5 PH stainless steel, having an overpressure capacity of 2×, a burst pressure capacity of 6× up to 500 psi, 5× up to 6000 psi, and 4× up to 10000 psi, a low range configuration of 100, 160, or 500 psi, and a high range configuration of 1000, 1500, 3000, 4000, 5000, 6000, and 10,000 psi. In certain embodiments, the pressure transducer is a P571 stainless steel pressure transducer available from Viatran of Tonawanda, N.Y.

Figure 25:
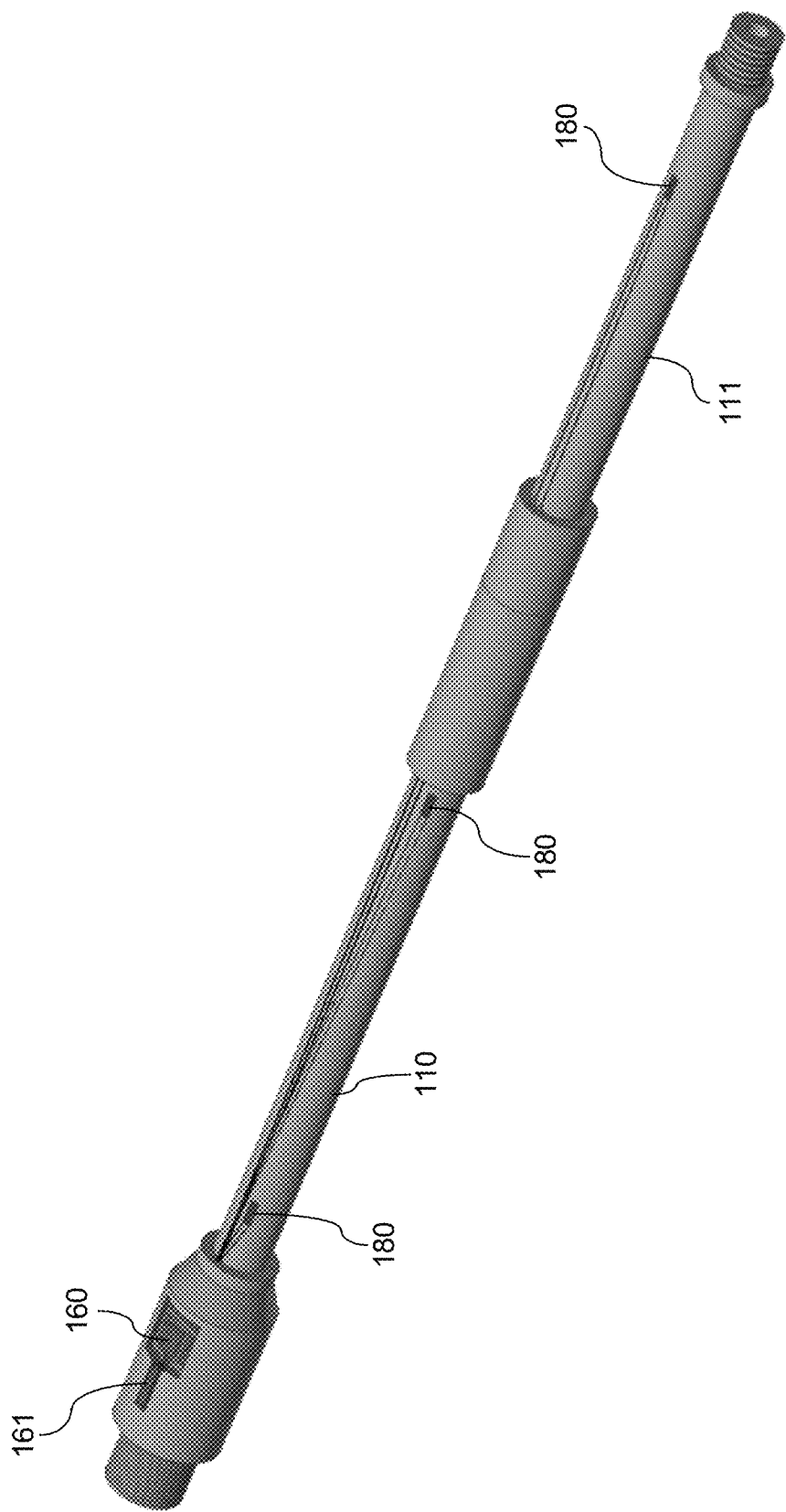
FIG. 25 is an isometric view of a modular barrel according to an exemplary embodiment, with the potting removed, showing a plurality of strain gauges spaced along its length.
Figure 26:
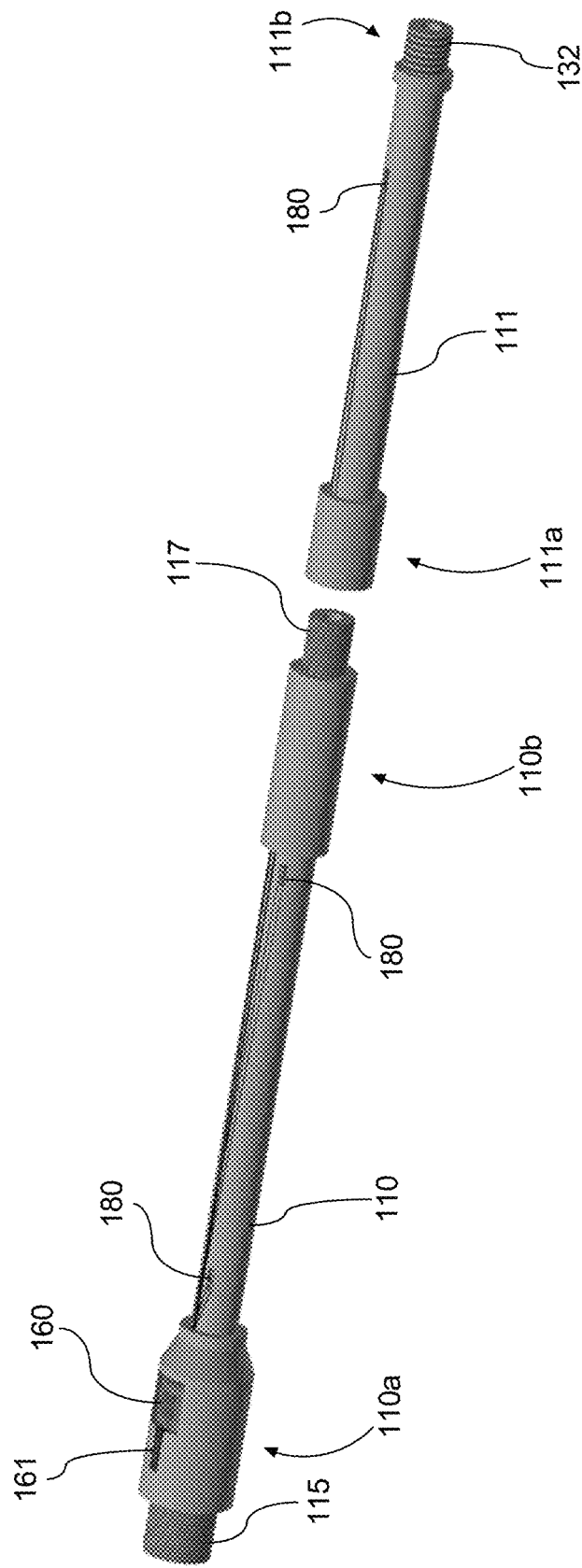
FIG. 26 is an exploded isometric view of the modular barrel of FIG. 25.
Figure 32:
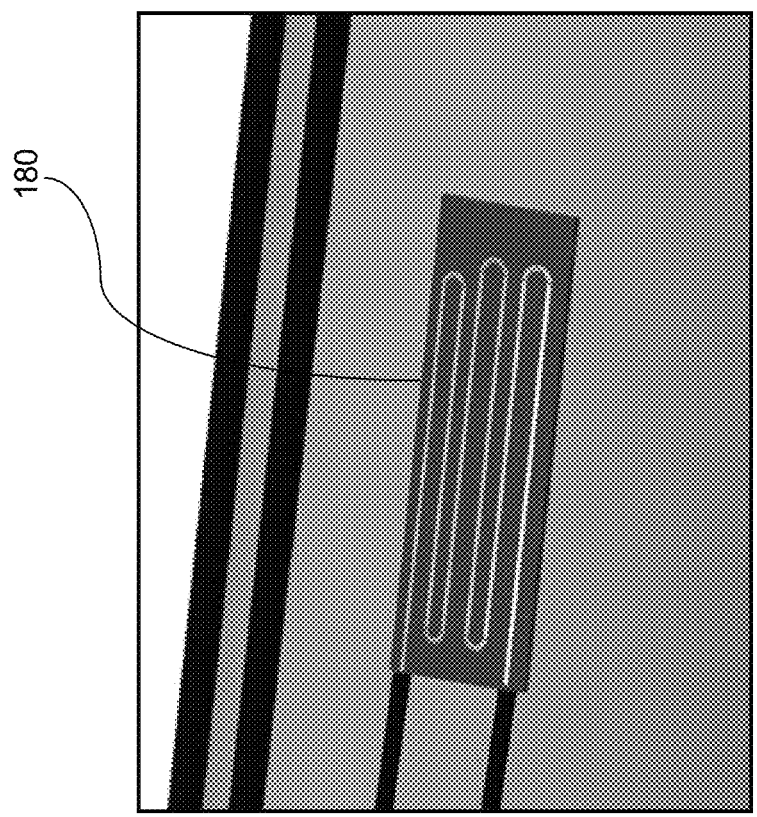
FIG. 32 is an enlarged view of a strain gauge appearing in FIG. 25.

In certain embodiments, each of the segments, 110, 111 have at least one strain gauge 180, which are electrically coupled to the ASIC processor 160 (shown in FIGS. 25, 26, and 32). In certain embodiments, the operating temperature of the strain gauges is at least 816° C. (1500° F.). In preferred embodiments, the strain gauges are wire resistance strain gauges, constructed of an iron chrome aluminum alloy, with high resistivity and excellent oxidation resistance.

Figure 29:
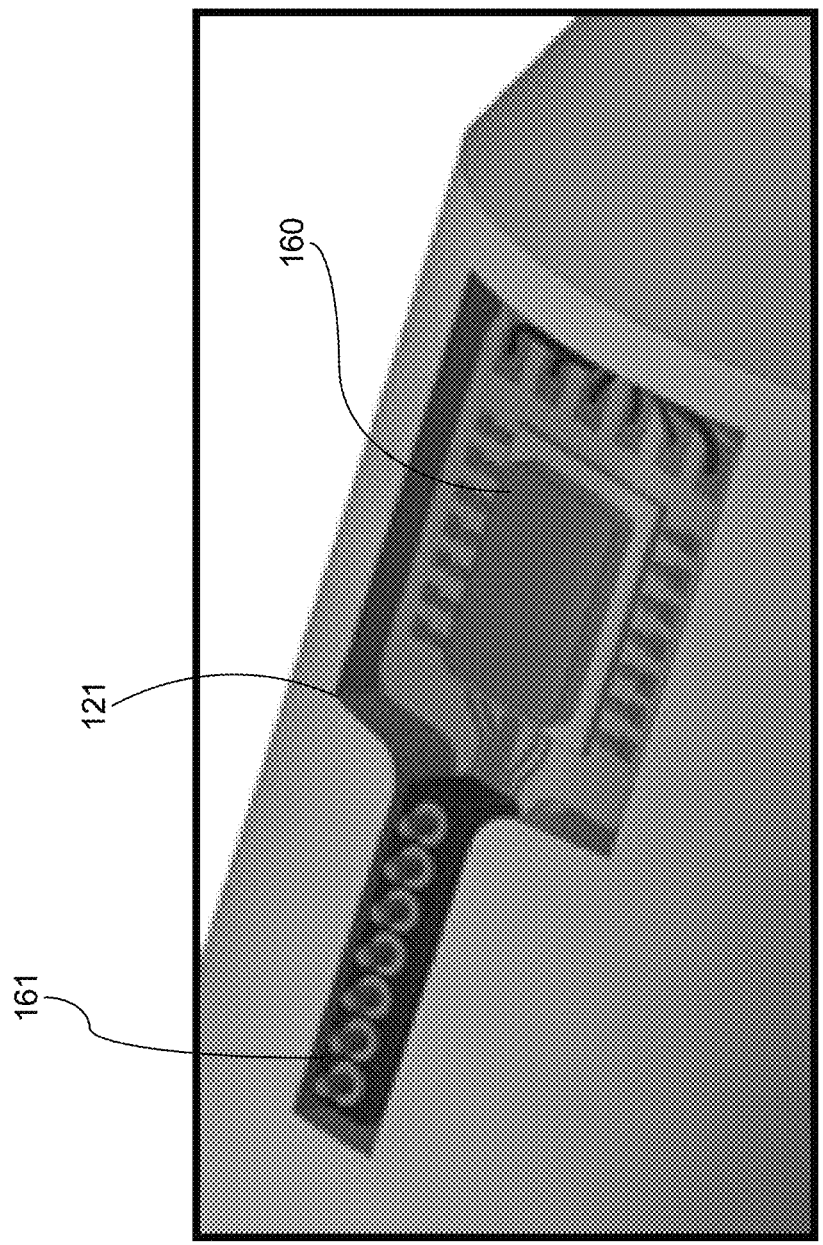
FIG. 29 is an enlarged, fragmentary view illustrating the ASIC processing unit appearing in FIG. 22.
Figure 30:
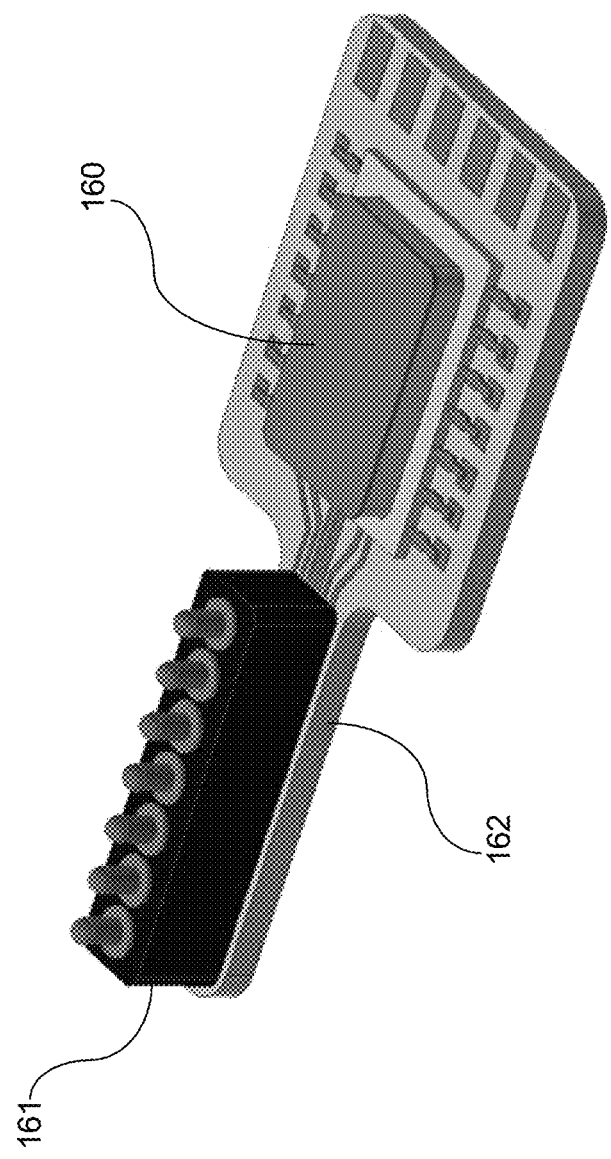
FIG. 30 is an enlarged view of the ASIC of FIG. 29.
Figure 31:
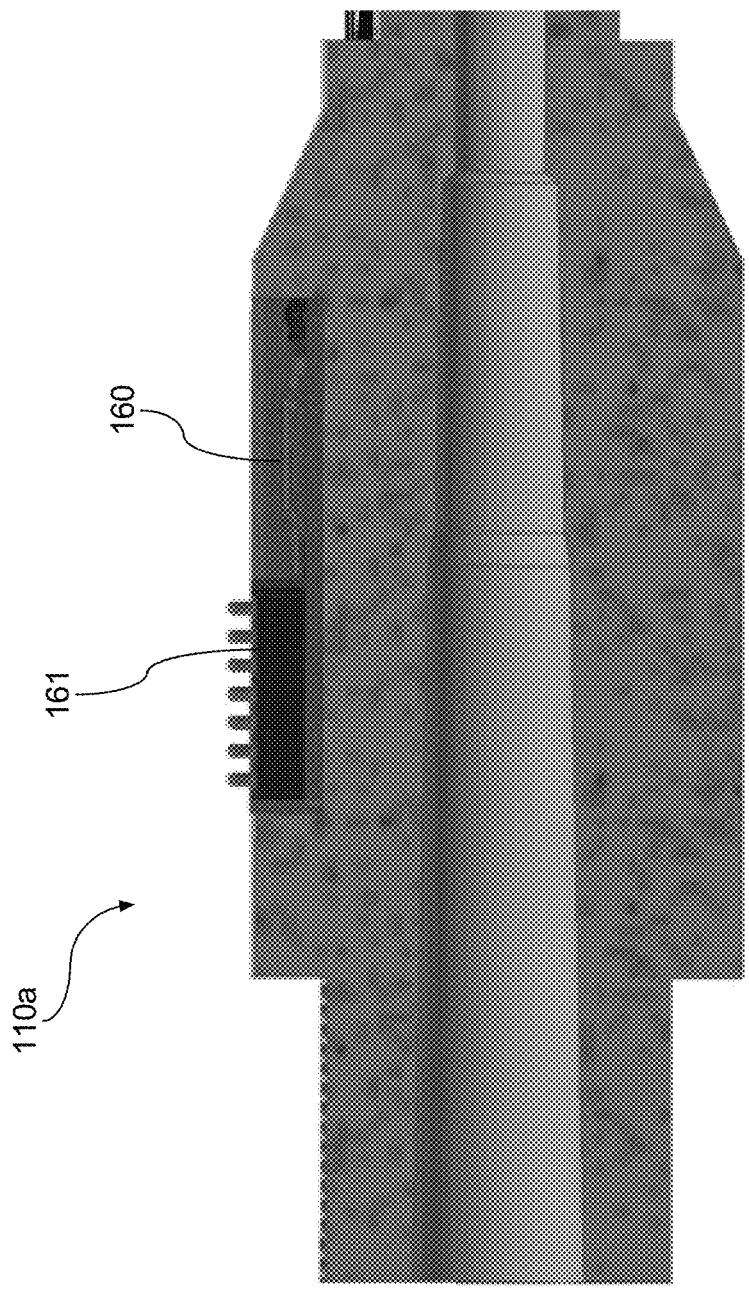
FIG. 31 is an enlarged, cross-sectional view of the breech end of the primary barrel segment of FIG. 29, containing the ASIC.
Figure 33:
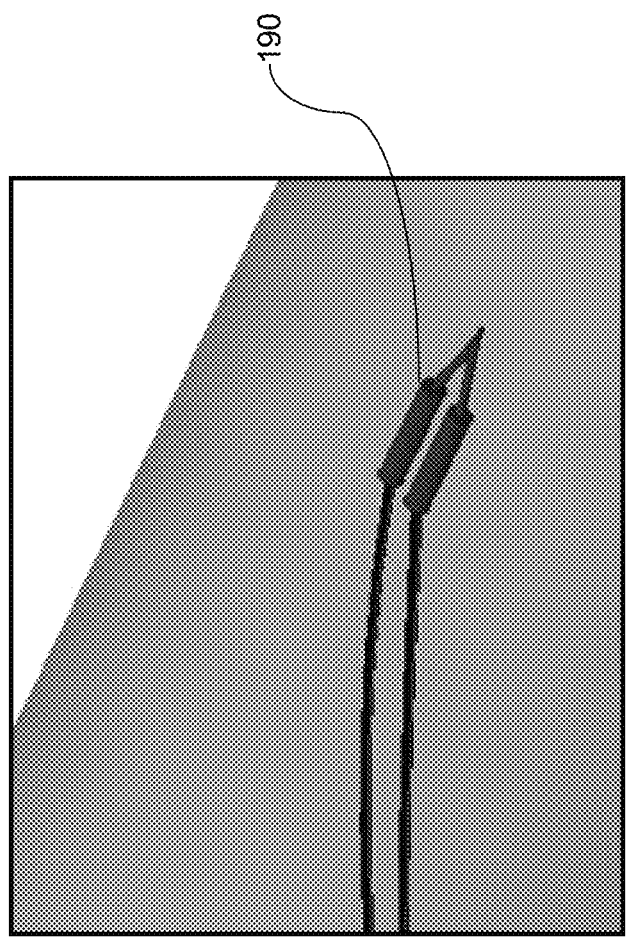
FIG. 33 is an enlarged view of a thermocouple appearing in FIG. 28.

In certain embodiments, at least one segment includes a thermocouple 190 for measuring the temperature of the barrel (shown in FIGS. 28, 29, and 33). In preferred embodiments, the thermocouple 190 is a tungsten-rhenium wire combination and capable of measuring ultra-high temperatures.

The thermocouple 190 outputs a signal, e.g., a voltage signal, representative of the temperature of the barrel and data representative of the thermal history of the barrel is logged in a memory associated with the processing electronics.

The ASIC processor 160 may receive and collect data from a number of different types of sensors. In certain embodiments, the thermocouple 190 is employed in conjunction with one or more additional sensors for providing additional data relating to the operation of the firearm. In certain embodiments, an alternative temperature sensor may be employed such as a thermistor or a semiconductor based temperature.

In the embodiment illustrated in FIG. 28, the thermocouple 190 is employed in conjunction with a barrel system in accordance with this disclosure employing a plurality of pressure transducers. It will be recognized, however, that the thermocouple for monitoring barrel temperature may also be employed with any other sensor system for detecting and monitoring shots fired by the firearm, including piezoelectric transducers, strain gauges, Hall effect sensors, axis accelerometers, and so forth. Logging barrel temperature information in combination with shot count information allows for improved accuracy of estimates of barrel wear and predicted future maintenance requirements. The rate of creation of barrel wear, e.g., as a result of the abrasive properties of the projectile and the propellant, the pressures exerted on the barrel by the expanding gas, and the corrosive effect of the expanding gas, increases greatly as barrel temperature increases.

In certain embodiments, the segments may be assembled prior to drilling the bore of the barrel and the vias, i.e., until the surface 126 of section 111 fully abuts the surface 124 of the section 110. Then, the vias in the upset regions on the segments 110, 111 may be drilled. The bore is then drilled and rifled (e.g., via cut rifling, button rifling (broaching)) in the assembled state with the vias still aligned. In this manner, the connectors 113a and 113b, in addition to transferring the signal from the sensors across the joint, further act as fiducials to ensure that the two sections are rotationally indexed in the same manner as when the rifling was cut, thus ensuring a continuous transition between the lands and grooves of the rifling between the segments.

It will be recognized that other configurations other than those appearing in the illustrated embodiment are contemplated. For example, in alternative embodiments, the distal end of the primary segment 110 is provided with a female threaded element and the proximal end of secondary segment 111 is provided with a male threaded element. In other alternative embodiments, both the distal end of segment 110 and the proximal end of segment 111 are provided with a male threaded elements and coupled with a coupling section (e.g., a short coupling section) having female threaded elements on each end. In yet other alternative embodiments, both the distal end of segment 110 and the proximal end of segment 111 are provided with a female threaded elements and coupled with a coupling section (e.g., a short coupling section) having male threaded elements on each ends.

In certain embodiments, the distal end 111b of the secondary segment 111 includes a threaded end 132, e.g., a male threaded end, for attachment of an accessory device (not shown) such as a flash suppressor 140 at the barrel exit.

Figure 17:
FIG. 17 shows an exemplary modular barrel assembly attached to a firearm in a long barrel configuration.
Figure 18:
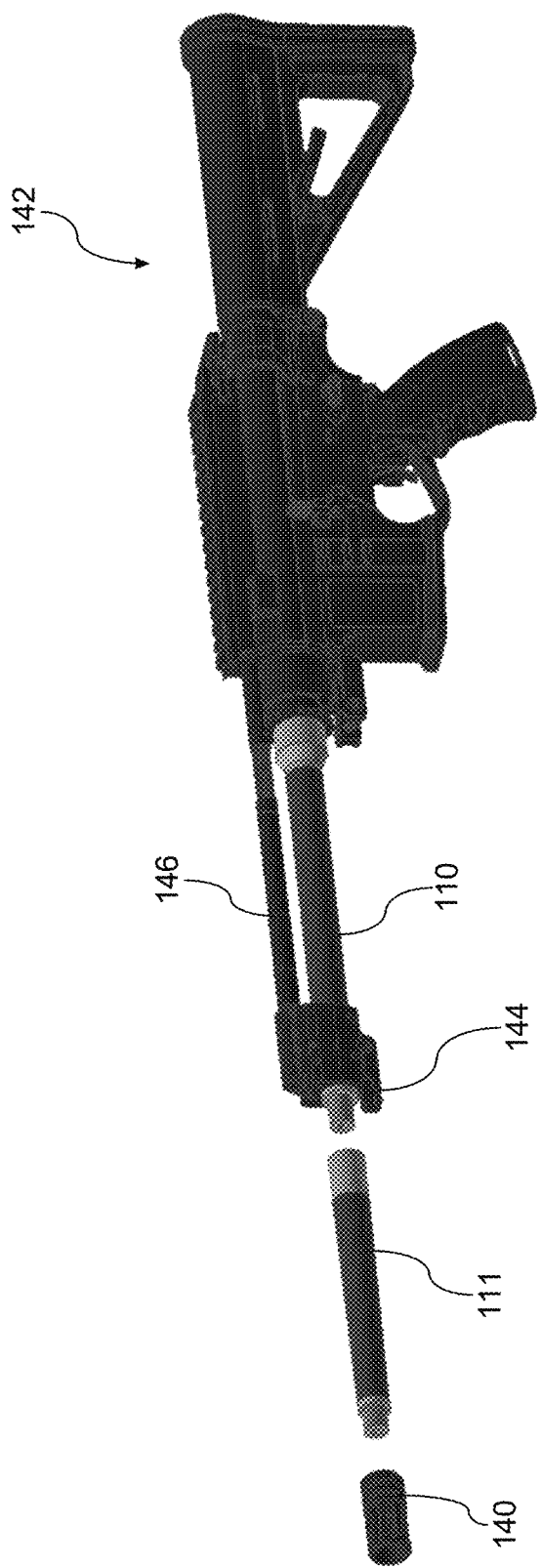
FIG. 18 shows an exploded view of the modular barrel assembly configuration appearing in FIG. 17, with the handguard removed for ease of exposition.
Figure 19:
FIG. 19 shows the modular barrel system of FIG. 17 attached to a firearm in a short barrel configuration.
Figure 20:
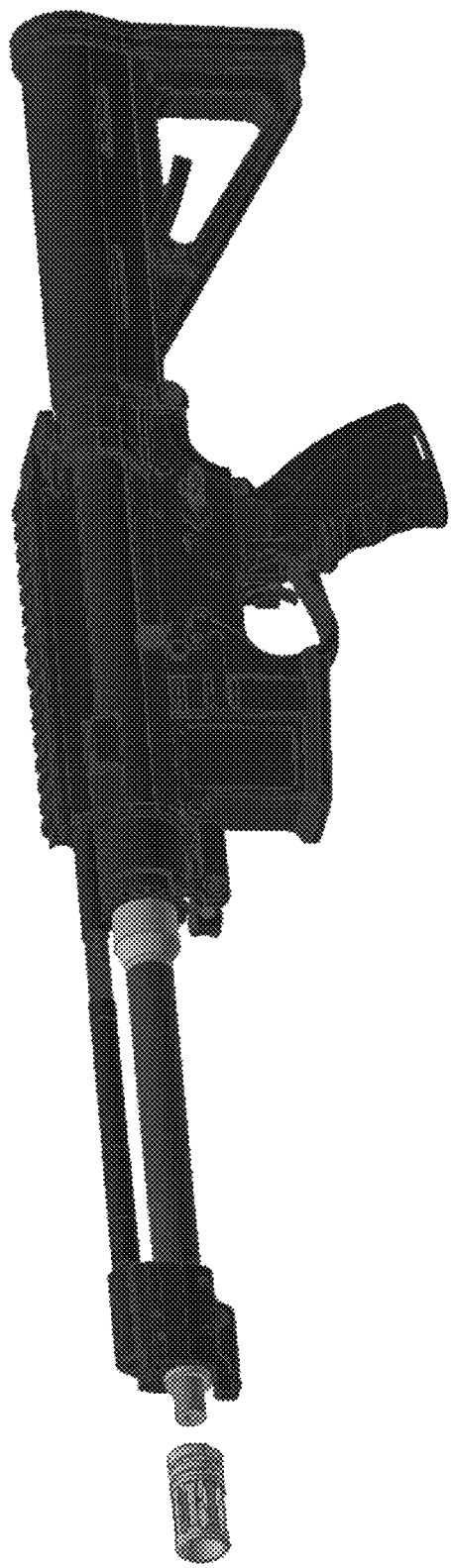
FIG. 20 shows an exploded view of the modular barrel assembly appearing in FIG. 19, with the handguard removed for ease of exposition.
Figure 22:
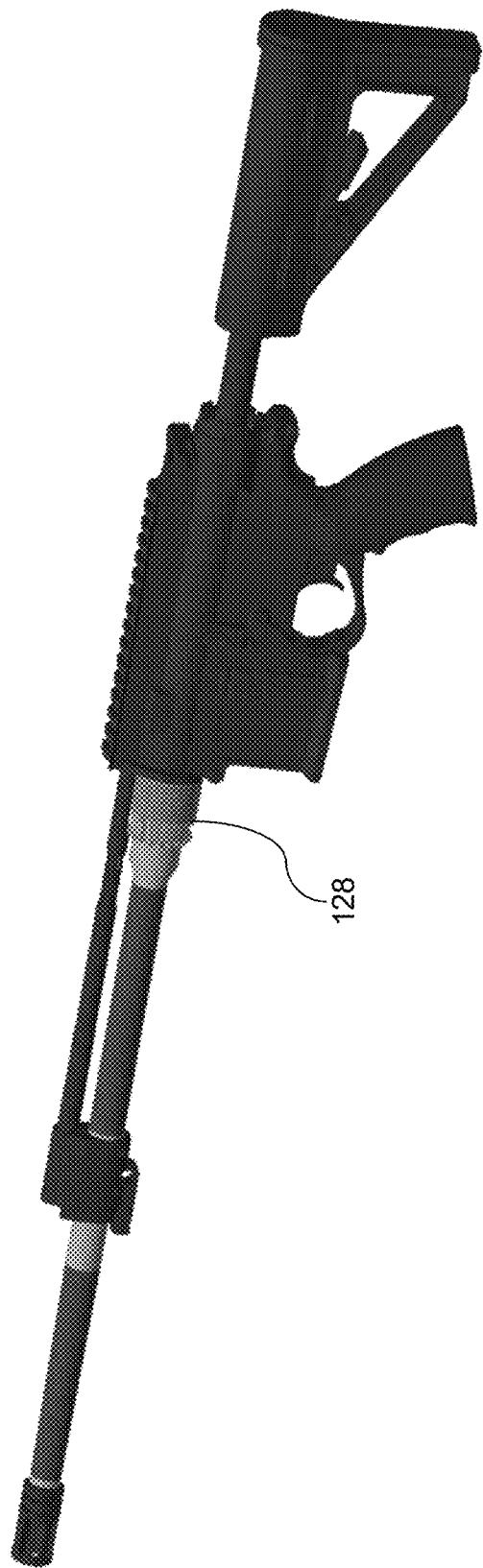
FIG. 22 is an exemplary modular barrel assembly having an application specific integrated circuit (ASIC) according to an exemplary embodiment, attached to a firearm in a long barrel configuration, with the handguard removed for ease of exposition.
Figure 23A:
FIGS. 23A and 23B are exploded views of the modular barrel assembly configuration appearing in FIG. 22 and illustrate the manner of transitioning from a close quarters combat (e.g., M4) setup to a more tactical long range barrel.
Figure 23B:
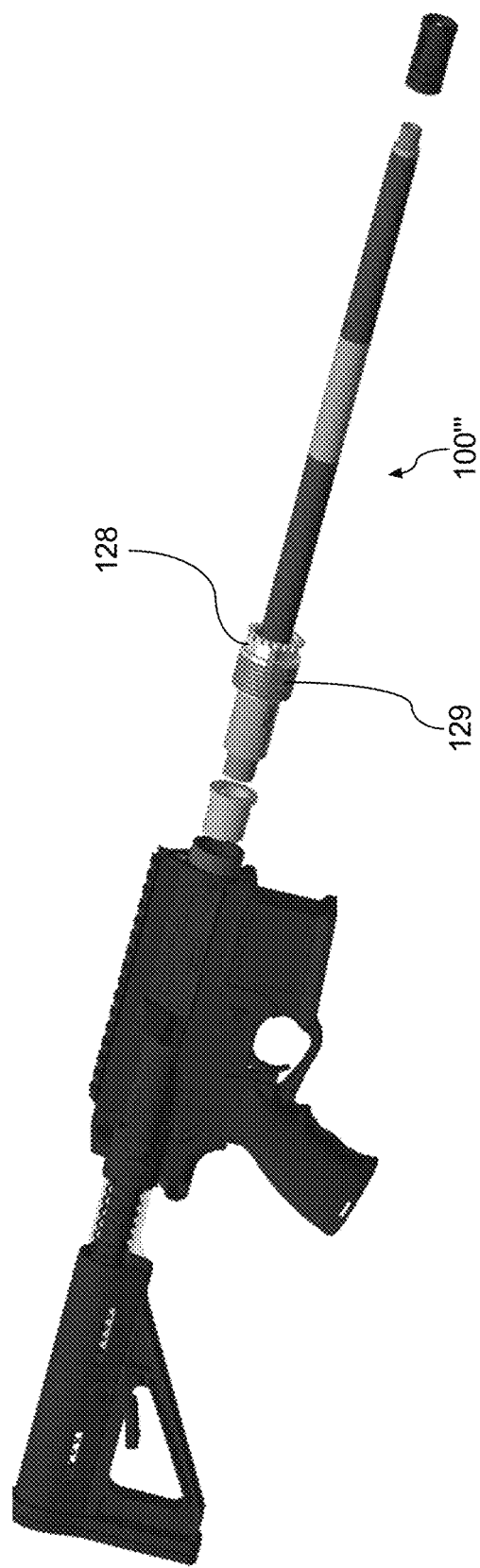
Figure 24:
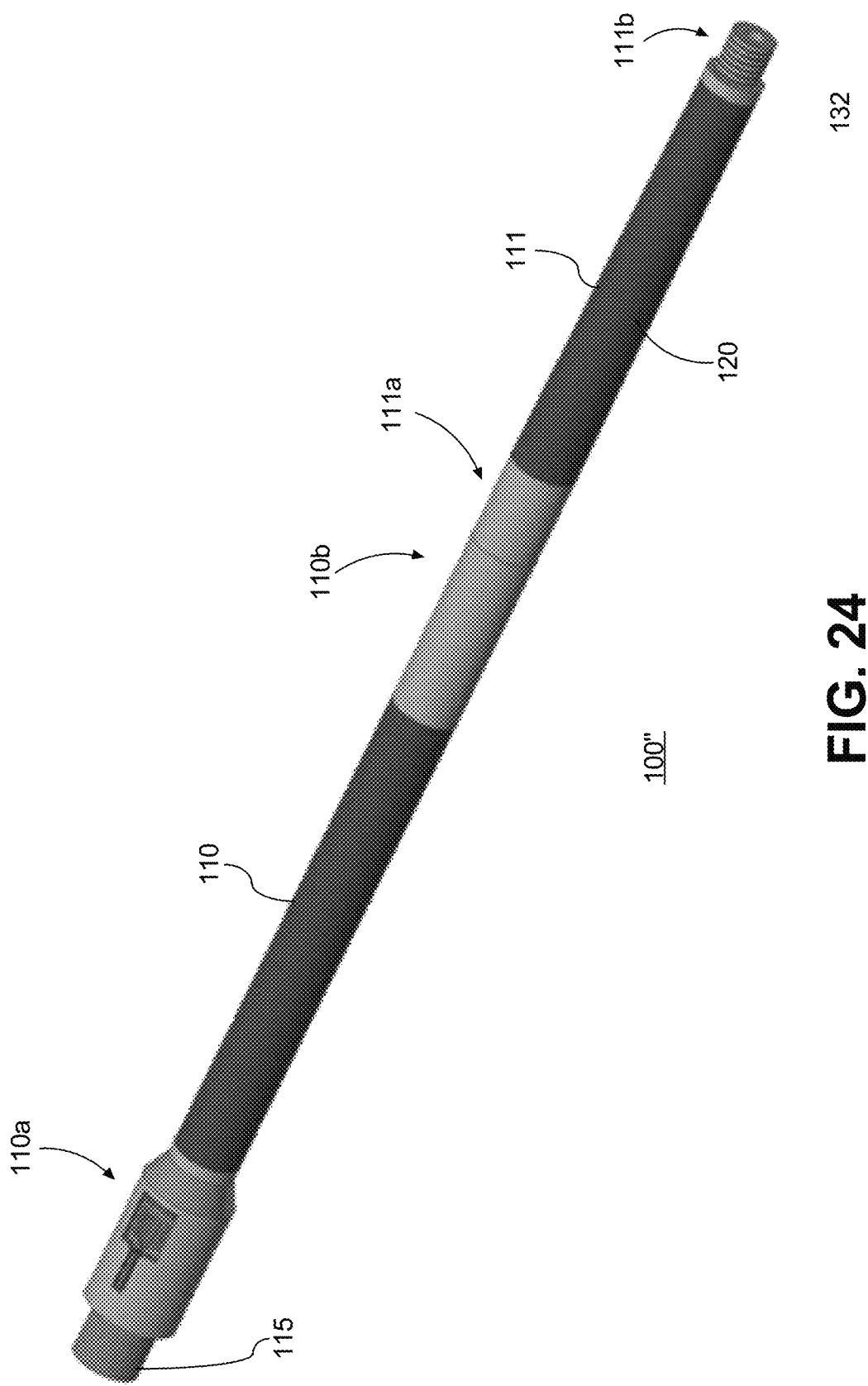
FIG. 24 is an isometric view of a modular barrel according to an exemplary embodiment.

FIG. 17 illustrates an exemplary modular barrel assembly attached to a firearm 142 in a long barrel configuration. FIG. 18 is an exploded view of the modular barrel assembly configuration appearing in FIG. 17, with the handguard removed for ease of exposition. FIG. 19 illustrates the modular barrel system of FIG. 17 attached to a firearm 142 in a short barrel configuration. FIG. 20 is an exploded view of the modular barrel assembly configuration appearing in FIG. 19, with the handguard removed for ease of exposition. FIG. 22 illustrates an exemplary modular barrel assembly attached to a firearm 142 in a long barrel configuration and including a barrel nut assembly 128. FIG. 23A-B are exploded views of the modular barrel system of FIG. 22.

In this manner, the user can readily transition from a long barrel configuration to a short barrel configuration simply by unscrewing the secondary segment and moving the flash suppressor from the muzzle end of the secondary segment to the muzzle end of the primary segment, and vice versa. There is no need to remove the gas tube or handguard, which can remain in position in both configurations. There is no need to remove the barrel nut on the receiver nor is there a need for any specialized tools typically required when removing and replacing a barrel, such as a vice, vice blocks, barrel nut wrench, torque wrench, and so forth.

Figure 21:
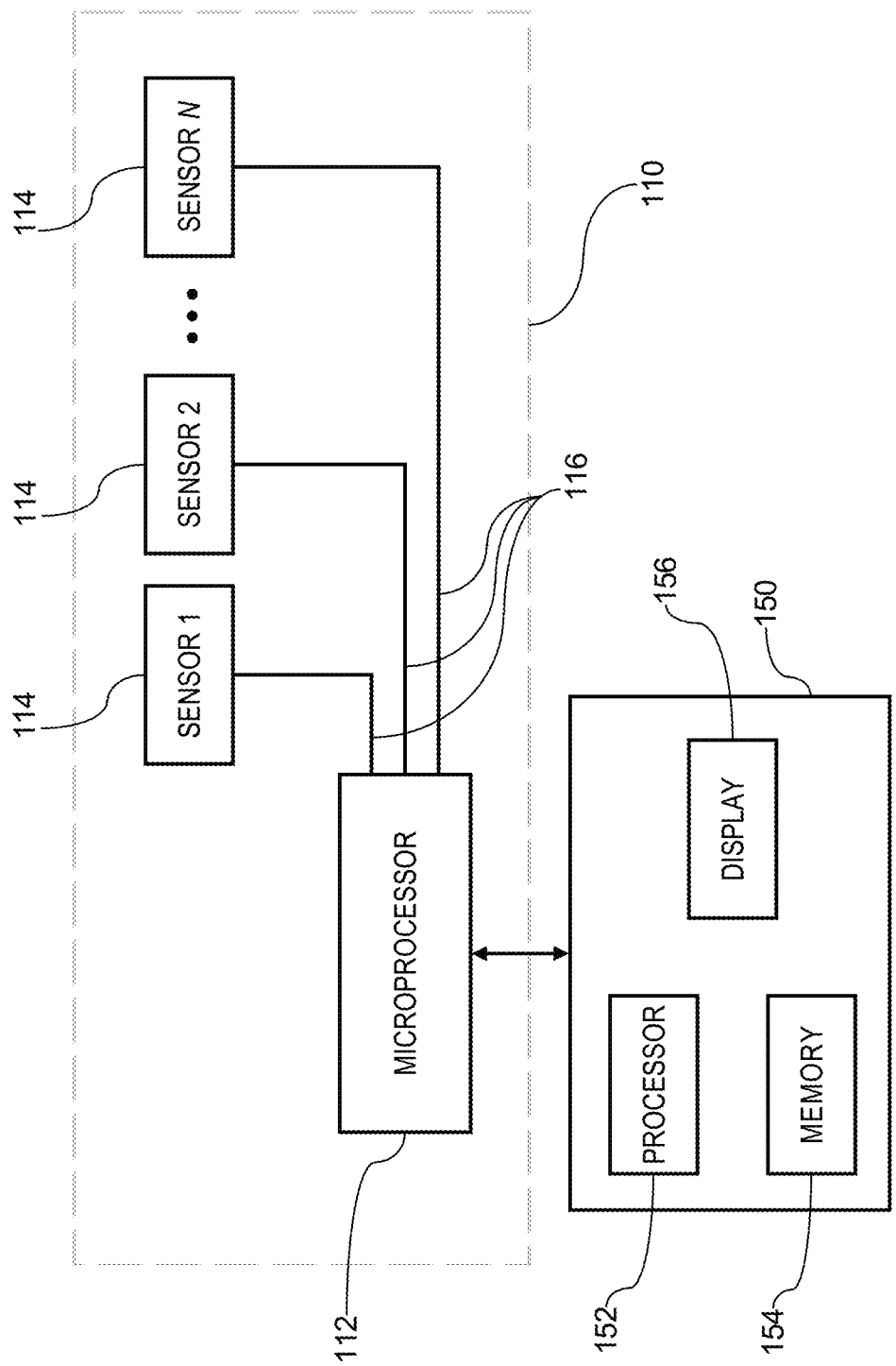
FIG. 21 is a functional block diagram illustrating an exemplary sensor system herein.

In certain embodiments, the user interface may be a simple display driven by the processor 112 (or 160) e.g., one or more lights (e.g., an LED or an LED array), an LCD display, (e.g., a segmented LCD display), etc., the output of which corresponds to certain metrics. Alternatively, as illustrated in FIG. 21, the system (e.g., 100, 100', 100") includes a user interface system 150 which includes a processor based information handling system including a higher level processor 152 and memory 154 for additional collection, storage, and analysis of data and metrics and a display 156 such as a liquid crystal display to present calculated metrics to the operator. Optionally, the interface system 150 may include an RF transceiver module, such as a Bluetooth module for wireless communication of the collected data to a wireless device or network.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A smart barrel system for a firearm, comprising:
   a barrel segment comprising a tubular member having an axial bore, a proximal end, and a distal end;
   one or more sensors disposed on the barrel segment; and
   a processor operatively connected to the one or more sensors by one or more conductive elements;
   wherein the barrel segment further comprises an outer layer disposed over at least a portion of the tubular member, and wherein the processor, one or more sensors, and conductive elements are embedded in said outer layer.

2. The smart barrel system of claim 1, wherein the one or more sensors are selected from the group consisting of piezoelectric transducers, strain gauge sensors, Hall effect sensors, pressure transducers, 2-axis accelerometers, 3-axis accelerometers, temperature transducers, thermocouples, and any combination of the foregoing.

3. The smart barrel system of claim 1, wherein the one or more sensors include a plurality of sensors, the plurality of sensors being positioned at predetermined locations along the barrel segment, wherein said predetermined locations are encoded in the processor.

4. The smart barrel system of claim 3, wherein at least one of the plurality of sensors is configured to generate an electrical signal in response to a projectile fired by the firearm passing through the barrel segment, and wherein the processor is configured to receive the electrical signal.

5. The smart barrel system of claim 1, wherein the one or more sensors comprises a plurality of sensors spaced along the barrel segment in known spatial relationship for detecting signals representative of any one or more of a velocity of the projectile, a number of rounds fired by the firearm, and a rate of fire of the firearm.

6. The smart barrel system of claim 1, wherein the one or more sensors are configured to generate an electrical signal representative of one or more smart barrel system parameters.

7. The smart barrel system of claim 6, further comprising an electronic memory associated with the processor for storing data representative of the one or more smart barrel system parameters.

8. The smart barrel system of claim 6, further comprising a display for displaying the one or more smart barrel system parameters in human viewable form.

9. The smart barrel system of claim 1, wherein the outer layer is selected from the group consisting of a fiber wrap impregnated with a polymer resin and a potting compound.

10. The smart barrel system of claim 1, further comprising an interface connection on the barrel segment and coupled to the processor by the one or more conductive elements.

11. The smart barrel system of claim 10, wherein the interface connection provides an electrical connection between the processor and an external power supply.

12. The smart barrel system of claim 1, wherein the barrel segment further comprises:
   a machined cavity formed near the proximal end of the barrel segment; and
   one or more vias formed in the barrel segment, the vias connecting to the machined cavity, wherein the conductive elements pass through the vias in the barrel segment to connect the processor and the one or more sensors.

13. The smart barrel system of claim 1 further comprising an upper receiver removably attached to the barrel segment via a barrel nut assembly.

14. The smart barrel system of claim 13, wherein the conductive elements further comprise one or more external contact points configured to mate with corresponding external connectors on the upper receiver.

15. The smart barrel system of claim 1, wherein the processor is an application-specific integrated circuit (ASIC) processor.

16. The smart barrel system of claim 15, wherein the ASIC processor is disposed on a ceramic substrate.

17. The smart barrel system of claim 1, wherein the one or more sensors includes a thermocouple for outputting a signal representative of a temperature of the barrel segment.

18. A smart barrel system for a firearm, comprising:
   a first barrel segment and a second barrel segment, each barrel segment comprising a tubular member having an axial bore, a proximal end, and a distal end;
   the proximal end of the first barrel segment having a first threaded element for removably attaching the first barrel segment to the firearm;
   the distal end of the first barrel segment having a second threaded element;
   the proximal end of the second barrel segment having a third threaded element which is complementary with the second threaded element, the third threaded element for removably attaching the second barrel segment to the first barrel segment;
   a plurality of sensors comprising one or more sensors disposed on the first barrel segment and one or more sensors disposed on the second barrel segment;
   a processor operatively connected to the plurality of sensors by a plurality of conductive elements, wherein the processor is disposed on the first barrel segment; and
   a barrel nut assembly for removably attaching the proximal end of the first barrel segment to a receiver of firearm, the barrel nut defining an interface between the processor and further processing electronics disposed on the firearm.

19. The smart barrel system of claim 18, wherein at least a portion of said plurality of electrical conductors pass through at least a portion of the first barrel segment, the second barrel segment, or both.

20. The smart barrel system of claim 19, wherein at least a portion of said plurality of electrical conductors are insulated with ceramic insulator sleeves.

21. The smart barrel system of claim 18, wherein the plurality of sensors are selected from the group consisting of piezoelectric transducers, strain gauge sensors, Hall effect sensors, pressure transducers, 2-axis accelerometers, 3-axis accelerometers, temperature transducers, thermocouples, and any combination of the foregoing.

22. The smart barrel system of claim 18, wherein the first barrel segment has a first externally upset portion adjacent the second threaded element and wherein the second barrel segment has a second externally upset portion adjacent the third threaded element, the first externally upset portion and the second externally upset portion abutting each other when the first barrel segment is assembled to the second barrel segment, wherein at least a portion of said plurality of electrical conductors pass through the first barrel externally upset portion, the second externally upset portion, or both.

23. A smart barrel system for a firearm, comprising:
   a barrel segment comprising a tubular member having an axial bore, a proximal end, and a distal end;
   one or more sensors disposed on the barrel segment;
   a processor operatively connected to the one or more sensors by one or more conductive elements; and
   an upper receiver removably attached to the barrel segment via a barrel nut assembly, wherein the conductive elements further comprise one or more external contact points configured to mate with corresponding external connectors on the upper receiver.

24. The smart barrel system of claim 23, wherein the one or more sensors are selected from the group consisting of piezoelectric transducers, strain gauge sensors, Hall effect sensors, pressure transducers, 2-axis accelerometers, 3-axis accelerometers, temperature transducers, thermocouples, and any combination of the foregoing.

25. A smart barrel system for a firearm, comprising:
   a first barrel segment and a second barrel segment, each barrel segment comprising a tubular member having an axial bore, a proximal end, and a distal end;
   the proximal end of the first barrel segment having a first threaded element for removably attaching the first barrel segment to the firearm;
   the distal end of the first barrel segment having a second threaded element;
   the proximal end of the second barrel segment having a third threaded element which is complementary with the second threaded element, the third threaded element for removably attaching the second barrel segment to the first barrel segment;
   a plurality of sensors comprising one or more sensors disposed on the first barrel segment and one or more sensors disposed on the second barrel segment; and
   a processor operatively connected to the plurality of sensors by a plurality of conductive elements;
   wherein the first barrel segment has a first externally upset portion adjacent the second threaded element and wherein the second barrel segment has a second externally upset portion adjacent the third threaded element, the first externally upset portion and the second externally upset portion abutting each other when the first barrel segment is assembled to the second barrel segment, wherein at least a portion of said plurality of electrical conductors pass through the first barrel externally upset portion, the second externally upset portion, or both.

* * * * *